United States Patent [19]

Matsuda et al.

[11] Patent Number: 4,866,617
[45] Date of Patent: Sep. 12, 1989

[54] METHOD OF GUIDING AN UNMANNED VEHICLE

[75] Inventors: Tomoo Matsuda, Fujisawa; Mitsuo Hosoi; Yohkichi Nishi, both of Hiratsuka; Eiji Yoshikawa, Kanagawa, all of Japan

[73] Assignee: Kabushiki Kaisha Komatsu Seisakusho, Tokyo, Japan

[21] Appl. No.: 30,193

[22] Filed: Mar. 25, 1987

[30] Foreign Application Priority Data

Jul. 11, 1986 [JP] Japan ................................. 61-164319

[51] Int. Cl.⁴ .............................................. G06F 15/50
[52] U.S. Cl. ................................ 364/424.02; 364/443; 180/169
[58] Field of Search ................... 364/424, 426, 424.02; 368/103; 318/587; 901/1, 67; 180/167, 168, 169

[56] References Cited

U.S. PATENT DOCUMENTS

| | | | |
|---|---|---|---|
| 3,642,087 | 2/1972 | Sampey | 180/168 |
| 4,530,056 | 7/1985 | Mackinnon et al. | 364/424 |
| 4,530,057 | 7/1985 | Ahlbom | 364/424 |
| 4,541,049 | 9/1985 | Ahlbom | 364/424 |
| 4,566,032 | 1/1986 | Hirooka et al. | 358/103 |
| 4,716,530 | 12/1987 | Ogawa et al. | 180/168 |
| 4,727,492 | 2/1988 | Reeve et al. | 364/424 |

FOREIGN PATENT DOCUMENTS 57-93406 6/1982 Japan.

Primary Examiner—Parshotam S. Lall
Assistant Examiner—Thomas G. Black
Attorney, Agent, or Firm—Diller, Ramik & Wight

[57] ABSTRACT

A method of an unmanned vehicle comprises the steps of placing a certain number of ground marks each of which comprises a plurality of line segments on a passage of the vehicle measuring amount of movement of the vehicle between the adjacent line segments when the vehicle moves across each of the ground marks, and obtaining a relative positional relation between the ground mark and the vehicle with reference to the amount of movement thereof whereby movement of the vehicle is properly guided in accordance with the thus obtained positional relation. In the case of a navigational guiding method typically employed in aircraft or ship, an estimated position of the vehicle is corrected with reference to the aforesaid relative positional relation.

19 Claims, 20 Drawing Sheets

METHOD OF GUIDING AN UNMANNED VEHICLE

BACKGROUND OF THE INVENTION

The present invention relates to a method of guiding an unmanned vehicle.

In order to properly guiding an unmanned vehicle, there is a necessity for knowing the position where the vehicle is located on a moving passage. Japanese Patent Application No. 93406/1982 discloses a technical concept that a plurality of ground marks are placed at proper positions on the moving passage and the correct position of the vehicle can be measured by detecting them from the vehicle.

However, this conventional method has a problem that means for detecting the ground marks requires a wide visual scope, and producing such detecting means is expensive.

On the other hand, a so-called navigational guiding method for guiding a vehicle along a previously taught moving passage has been hitherto employed in aircraft or ship. When this navigational guiding method is carried out, direction detecting means and movement distance detecting means are used to estimate the current position of an unmanned vehicle, but error in estimated value of position is increasingly accumulated due to slippage of the vehicle, ruggedness of ground or the like factor. Accordingly, the current correct position of the vehicle is obtained and the estimated value is then corrected with reference to the current correct position.

In this case, it is naturally necessary to teach the position of the ground marks previously.

To teach positions of each ground marks and certain points on the passage, these positions must be measured previously. However, such measurement requires long time and many man hours. Particularly, in the case where there is a necessity for frequently changing the moving passage, it is very troublesome to carry out such measurement.

In the navigational guiding process, the position of each ground point on the moving passage is successively given as target position for the vehicle, but there arises a problem that malfunction such as delayed steering or the like takes place due to improper timing of giving target points.

Further, in the conventional navigational guiding process, controlling is effected for orienting the fore wheels as seen in the direction of movement toward the target point. However, in the case where a fore wheel stearing vehicle is operated or in the case where a rear wheel stearing vehicle is driven in the backward direction, the navigational guiding process fails to function properly.

SUMMARY OF THE INVENTION

Hence, the present invention has been made with the foregoing background in mind.

An object of the present invention is to provide a method of guiding an unmanned vehicle which assures that the method can be practiced with the use of inexpensive ground mark detecting means.

Another object of the present invention is to provide a method of guiding an unmanned vehicle which assures that teaching of a moving passage is effected very simply and moreover changing of the moving passage is carried out easily.

Still another object of the present invention is to provide a method of guiding an unmanned vehicle which assures that the vehicle moves on a moving passage having complicated curved portions without any occurrence of delayed steering.

Further another object of the present invention is to provide a method of guiding an unmanned vehicle which assures that guiding of the vehicle is effected with a proper steering angle in the case where rear wheels as seen in the direction of movement of the vehicle serves as steering wheel.

To accomplish the above objects, it is proposed according to the present invention that a certain number of ground marks each of which comprises a plurality of line segments are placed on a moving passage of an unmanned vehicle and a relative positional relation between the ground mark and the vehicle is obtained by measuring amount of movement of the vehicle between the adjacent line segments when the vehicle moves across the ground mark.

When the navigational guiding process is employed, ground marks are placed at a plurality of predetermined positions within the moving area of the vehicle and a moving passage of the vehicle is determined by selectively assigning the ground marks Further, by interpolating an area between the adjacent assigned ground marks, the position of each of ground points on the moving passage is obtained and the thus obtained position is then taught to the vehicle.

Further, according to the invention, a distance between the current position of a target ground point on the moving passage and the current position of the vehicle is obtained during navigational guiding and when the distance becomes shorter than a predetermined one or it increases as the vehicle goes on, the current target ground point is changed to next one Furthermore, according to the invention, an imaginary steering wheel is supposed at the position located forwardly of a non-steering wheel by a length of the wheel base of the vehicle in the case where the rear wheel as seen in the direction of movement of the vehicle serves as steering wheel. A steering angle is then obtained when the imaginary steering wheel is oriented toward the current target ground point on the moving passage and a value of the steering angle of which sign is reversed is used as a steering command value.

BRIEF DESCRIPTION OF THE DRAWINGS

The invention is illustrated by the following drawings in which.

DETAILED DESCRIPTION OF THE PREFERRED EMBODIMENTS

Now, the present invention will be described in a greater detail hereunder with reference to the accompanying drawings which illustrate preferred embodiments thereof.

Figure 1:
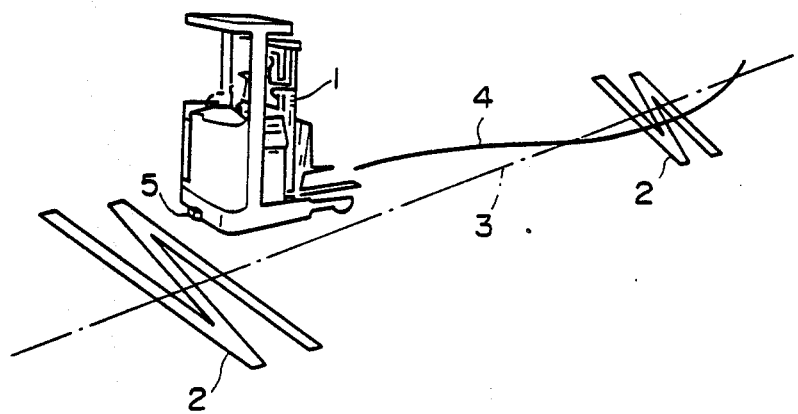
FIGS. 1, 7, 9 and 11 are perspective views respectively which schematically illustrate arrangement of ground marks on a moving passage.

In FIG. 1 reference numeral 1 designates an unmanned or unattended vehicle on which no operator rides, reference numerals 2 designate ground marks, reference numeral 3 designates a track on which it is planned that the unmanned vehicle 1 moves, reference numeral 4 designates a locus along which the unmanned vehicle 1 has moved and reference numeral 5 designates a sensor which is mounted on the unmanned vehicle 1.

The unmanned vehicle 1 is equipped with a direction detector and a running distance detector (both of which are not shown in the drawing) and automatic steering for allowing the vehicle 1 to move on the track 3 by estimating with the use of the above-mentioned detectors the current position where the vehicle is located at present.

Figure 2:
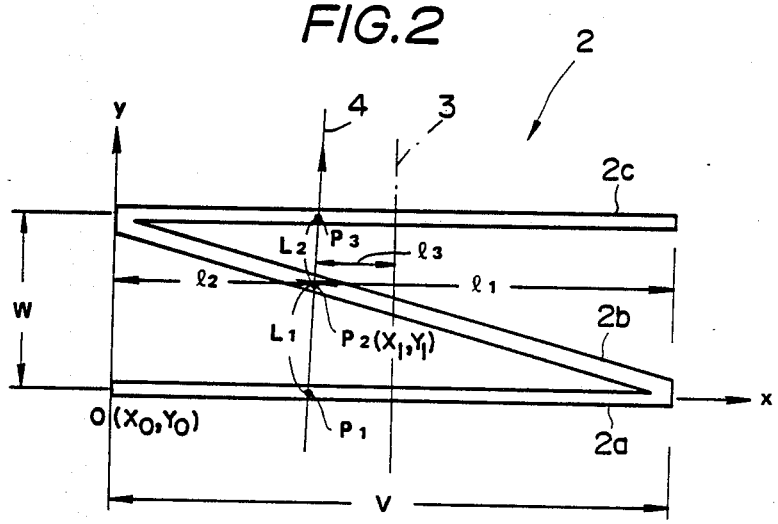
FIGS. 2, 4, 8, 10, 12, 20 and 21 are schematic views respectively which illustrate structure of a ground mark and a principle for detecting the position of an unmanned vehicle with the use of the ground mark.

As is apparent from FIG. 2, each of the ground marks 2 is constituted by three line segments 2a, 2b and 2c which extend across the planned track or passage 3 in the transverse direction. The line segments 2a and 2c are in parallel with one another and the line segment 2b diagonally extends between the tail end of the line segment 2a and the leading end of the line segment 2c. With respect to the ground mark 2, it is preferable that the line segments 2a and 2c extend at a right angle relative to the passage 3 and the passage extends through the middle point of each of the line segments.

Metallic plate, metallic tape, metallic wire or the like is employed as material constituting each of the line segments on the assumption that floor is built from concrete without any metallic material embedded therein. Further, in the illustrated embodiment, a metallic material sensor, for instance, an eddy current sensor is employed for the sensor 5 mounted on the vehicle to detect the line segments 2a–2c. For the sake of convenience, one example of a combination of material of the ground mark and sensor will be shown on the following table.

| sensing medium | sensor | material employable for ground mark |
|---|---|---|
| magnetism | eddy current sensor coil metallic material detector (Each of them is such that it can detect fluctuation in permeability of conductivity.) | steel frame, steel pile, metallic wire, metallic plate, electric conductive sheet, electric conductive coating, ferrite plate, ferrite coating, magnetic tape (inclusive tape, wire, rod, block, tile or the like having metallic material, ferrite or electric conductive material) |
| light beam | photo-transistor photo-diode photoelectric tube (Each of them is such that light beam can be reflected therefrom.) | reflective returning reflection tape, white line tape, metallic tape, coating, colored tile, colored block or the like each of which has color or reflectivity distinguishable from those of the surrounding floor |

Next, description will be made as to the case where the unmanned vehicle 1 moves past the ground mark 2 and the sensor 5 scribes the locus 4 as represented by a solid line (also 4) in FIG. 2 as a result of movement of the vehicle in the direction indicated. When a distance L (L1+L2) between the line segments 2a and 2c on the ground mark 2 is sufficiently small, it can be considered that the locus 4 is an approximately extending linear line. It should be noted that description has been made on the assumption that the locus 4 is scribed when the vehicle 1 moves from the lower side toward the upper side as seen in the drawing.

First, the locus 4 intersects the line segment 2a at point $P_1$, then it does the line segments 2b at point $P_2$ and finally it does the line segment 2c at point $P_3$. As a result, the sensor 5 generates signals which inform that the sensor 5 detects the line segments 2a, 2b and 2c at points $P_1$, $P_2$ and $P_3$ (see FIG. 3).

Figure 3:
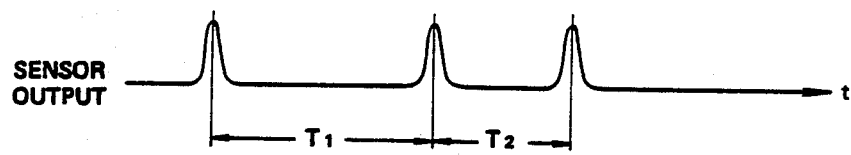
FIGS. 3 and 5 are wave form diagrams respectively which illustrate a wave form of output signals from a sensor when a ground mark as shown in FIGS. 2 and 4 is used.

When it is assumed that the vehicle 1 moves at a constant speed, a ratio of distance $L_1$ between points $P_1$ and $P_2$ to distance $L_2$ between points $P_2$ and $P_3$ is equal to a ratio of a time interval $T_1$ to a time interval $T_2$ in FIG. 3 and moreover it is equal to a ratio of length $l_1$ to length $l_2$.

Accordingly, an amount of course deviation $l_3$ of the vehicle from the center line on the ground mark 2 (which is identical to the passage 3) can be determined by receiving output signals from the sensor and measuring time intervals $T_1$ and $T_2$. This is because amount of the course deviation 13 can be expressed as follows:

$$l_3 = \tfrac{1}{2}V - l_2$$
$$= \tfrac{1}{2}V - \frac{l_2}{l_1 + l_2} V$$
$$= \tfrac{1}{2}V - \frac{T_2}{T_1 + T_2} V$$

where V is the width of the mark 2.

Incidentally, in the illustrated embodiment where the vehicle is equipped with a single sensor 5, the width of the ground mark, that is, $(l_1+l_2)$ defines a scope of detection. In the case where the vehicle is equipped with two sensors 5 which are located in spaced relation in the transverse direction it results that a scope of detection can be widened by a distance between the sensors. Next, description will be described below as to how an occurrence of incorrect sensing of the ground mark is prevented.

In the case where metallic material is used for the line segments 2a to 2c, the sensor 5 may sense the ground mark 2 incorrectly when a certain article made of metallic material is placed on the floor. Similarly, in the case where white lines are employed for the line segments 2a to 2c, incorrect sensing may be effected when the floor has a spot which is coated with white ink.

In order to prevent an occurrence of incorrect sensing, it is recommended that one or more additional line segments are provided at the position located before or after the ground mark 2.

Figure 4:
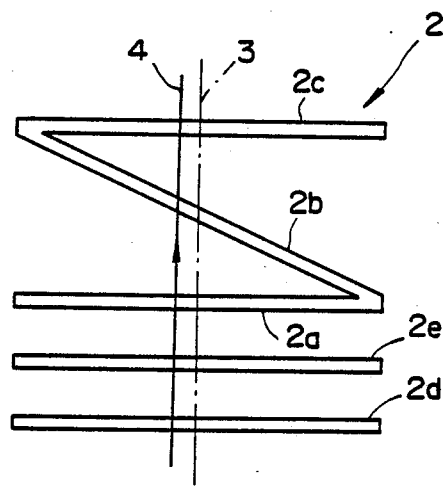

FIG. 4 illustrates the case where new line segments 2d and 2e are added to the ground mark 2 which comprises lines segments 2a, 2b and 2c. As is apparent from the drawing, the line segments 2d and 2e extend in parallel with the line segments 2a and 2c. In this case five sensor outputs indicative of movement of the sensor 5 on the locus 4 are as shown in FIG. 5.

Figure 5:
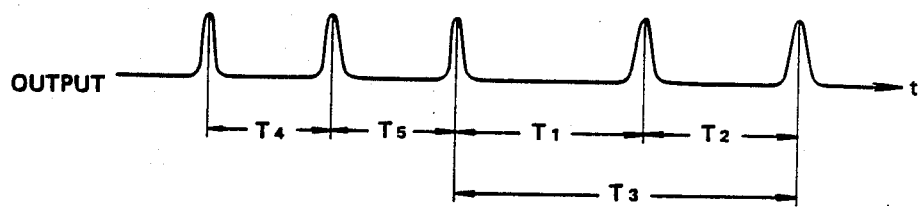

Referring to FIG. 5, when the speed of the vehicle 1 is kept constant, ratio of time interval $T_3$ to time interval $T_4$ or $T_5$ relative to output signals from the sensor does not vary irrespective of how the vehicle is deviated from the correct course but ratio of time interval $T_1$ to time interval $T_2$ varies in dependence on an amount of deviation of the vehicle from the course. Namely, sensor signals appear at time intervals $T_4$, $T_5$ and $T_3$, as long as any signal outputted from the sensor 5 does not contain noise. Accordingly, it can be discriminated with reference to ratios relative to time intervals as mentioned above whether or not a detection signal from the sensor is generated by line segment or noise.

Incidentally, in the case where speed of the vehicle varies remarkably, it is recommendable to measure a distance of movement of the vehicle for each of time intervals instead of employment of the time intervals from the sensor.

In the example as shown in FIG. 4, two additional line segments 2e and 2d are provided at the position below the line segment 2a. It is obvious that the same advantageous effects are obtainable when one or more than three additional line segments are provided at the position before the line segment 2a or after the line segment 2c.

Figure 6:
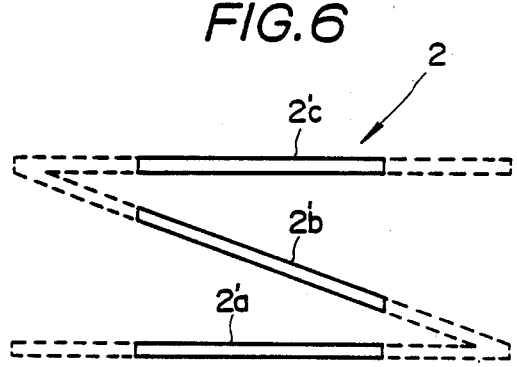
FIGS. 6, 18 and 19 are schematic views respectively which illustrate other structure of a ground mark.

Incidentally, a shape of the ground mark 2 should not be limited only to that as shown in FIG. 2. Alternatively, a ground mark 2′ including line segments 2′a, 2′b and 2′c of which both the sides are cut off as shown in FIG. 6 may be employable. Further, ground marks whose shape is reversed to those shown in FIGS. 2 and 6 may also be employed.

Further, by locating the ground mark 2 at a known position on the track 3, it is possible to detect the current correct position of the vehicle when the latter moves past the ground mark 2. Since the current correct position can be sensed in that way, the current position of the vehicle which is detected continuously by a direction detector 43 and a running distance detector 44 mounted on the vehicle 1, as will be described hereinafter in connection with FIG. 14, can be corrected to the above-mentioned current correct position every time the ground mark is detected.

In the case where a distance between both the line segments 2a and 2c constituting the ground mark 2 or a moving speed of the vehicle is kept constant and previously known, an entrance angle of the vehicle into the ground mark can be obtained by measuring a period of time required for moving by the aforesaid distance.

Figure 7:
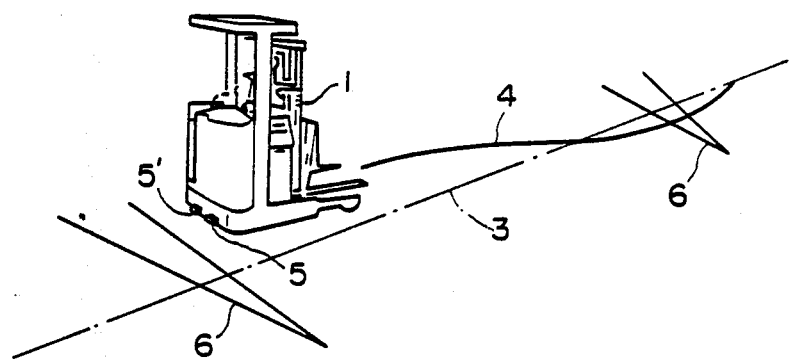
Figure 8:
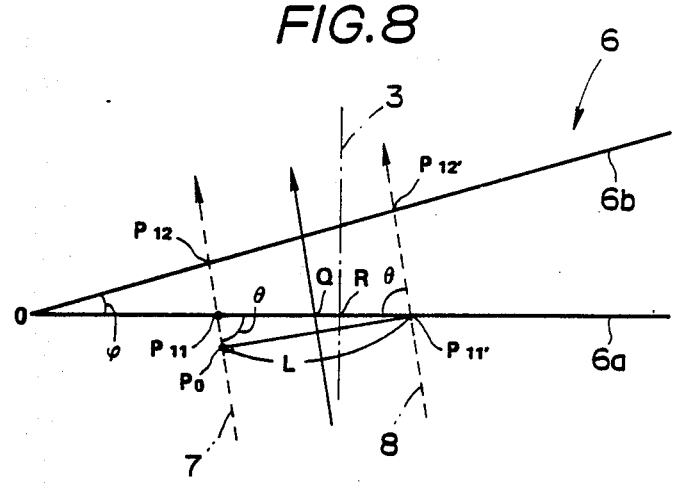
Figure 9:
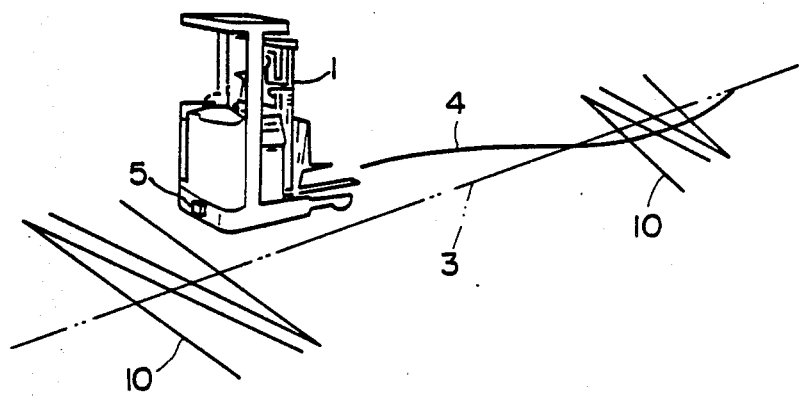

FIG. 7 shows an embodiment in which two ground marks 6 each of which is constructed by two line segments 6a and 6b as shown in FIG. 8 are placed on the moving track in the spaced relation and an unattained vehicle 1 is equipped with two sensors 5 and 5′ to guide movement thereof.

As is apparent from the drawing, both the line segments 6a and 6b are not in parallel with one another. In this embodiment they are so arranged that the line segment 6a extends at a right angle relative to the planned moving track 3 and the line segment 6b intersects the line segment 6a at the one end (intersection O) of the line segment 6a at an inclination angle of $\phi$.

When it is assumed that the unmanned vehicle 1 moves past the ground mark 6 and thereby loci 7 and 8 as illustrated in FIG. 8 are scribed by means of the sensors 5 and 5′, the locus 7 first intersects the line segment 6a at point $P_{11}$ located on the line segment 6a and then it intersects the line segment 6b at point $P_{12}$ located on the line segment 6b. Similarly, the locus 8 first intersects the line segment 6a at point $P_{11}'$ located on the line segment 6a and then it intersects the line segment 6b at point $P_{12}'$ located on the line segment 6b. Accordingly, there are generated signals which inform that the sensor 5 detects the line segments by intersections $P_{11}$ and $P_{12}$ and the sensor 5′ detects the line segments by intersections $P_{11}'$ and $P_{12}'$.

Here, description will be made as to a principle for obtaining an angle of $\theta$ which is formed between the line segment 6a and the direction of movement of the unattended vehicle 1 (the direction of extension of the loci 7 and 8).

Referring to FIG. 8, the point $P_0$ represents the position where the sensor 5 is located when the sensor 5' reaches the point $P_{11}'$. Since a triangle $P_{11}$, $P_{11}'$, $P_0$ defined by intersections $P_{11}$ and $P_{11}'$ and position $P_0$ is a right-angled triangle, an angle of $\theta$ is represented by the following formula (1).

$$\theta = \tan^{-1} \frac{L}{\overline{P_0 P_{11}}} \qquad (1)$$

where L designates a distance between both the sensors 5 and 5'.

Accordingly, the aforesaid angle $\theta$ can be obtained in accordance with the formula (1) by measuring the distance $\overline{P_0 P_{11}}$ of movement of the vehicle 1 from the time when the sensor 5' reaches the intersection $P_{11}$, to the time when the sensor 5 reaches the intersection $P_{11}$, wherein measurement is achieved by using means, for instance, length measuring ring or the like.

Next, description will be made below as to how the position where intersections $P_{11}$ and $P_{11}'$ are located is obtained. Distance $\overline{OP_{11}}$ between the interlocated section O (reference point) of the line segments 6a and 6b and the intersection $P_{11}$ as well as distance $\overline{OP_{11}'}$ between the intersection O and the intersection $P_{11}'$ are represented by the following formulas (2).

$$\left. \begin{array}{l} \overline{OP_{11}} = \overline{P_{11}P_{12}}(\cos\theta + \cot\phi \cdot \sin\theta) \\ \overline{OP_{11}'} = \overline{P_{11}'P_{12}'}(\cos\theta + \cot\phi \cdot \sin\theta) \end{array} \right\} \qquad (2)$$

where $\phi$ designates an angle formed by the line segments 6a and 6b.

Accordingly, by measuring the distance $\overline{P_{11}P_{12}}$ from the time when the sensor 5 detects the line segment 6a to the time when it detects the line segment 6b as well as the distance $\overline{P_{11}'P_{12}'}$ from the time when the sensor 5' detects the line segment 6a to the time when it detects the line segment 6b by using means, for instance, a length measuring ring or the like, the position of the sensors 5 and 5' as seen in the transverse direction relative to the line segment 6a can be obtained with reference to the aforesaid distances, angle $\theta$ and angle $\phi$.

When it is assumed that the position where the middle point between both the sensors 5 and 5' moves across the line segment 6a is identified by Q, the distance $\overline{OQ}$ as measured from the reference point O to the aforesaid point Q is represented by the following formula.

$$\overline{OQ} = \tfrac{1}{2}(\overline{OP_{11}} + \overline{OP_{11}'}) \qquad (3)$$

$$= \tfrac{1}{2}(\overline{P_{11}P_{12}} + \overline{P_{11}'P_{12}'})(\cos\theta + \cot\phi \cdot \sin\theta)$$

Further, when it is assumed that the position where the passage 3 extends across the line segment 6a is identified by R, an amount of course deviation $\overline{RQ}$ of the vehicle 1 from the aforesaid point R is represented by the following formula (4).

$$\overline{RQ} = \overline{OR} - \overline{OQ} \qquad (4)$$

$$= \overline{OR} - \tfrac{1}{2}(\overline{P_{11}P_{12}} + \overline{P_{11}'P_{12}'})(\cos\theta + \cot\phi \cdot \sin\theta)$$

It should be noted that OR in the above formula is previously known.

The amount of course deviation obtained in the above-described manner is typically utilized as an information for controlling steering of the vehicle so as to cancel this amount of course deviation. Further, it may be utilized for correcting the estimated position of the vehicle when navigational guidance to be described later is carried out. Since a true coordinate position of the vehicle can be detected with reference to the coordinate position where ground marks 2 or 6 are laced, the current position of the vehicle which is detected continuously by a direction detector 43 and a running distance detector 44 mounted on the vehicle 1 as will be described hereinafter in connection with FIG. 14, can be corrected with reference to the above-mentioned true coordinate position.

Incidentally, due to the fact that the direction of movement of the vehicle can be detected in accordance with the formula (1) in the embodiment as illustrated in FIG. 7, various induction inclusive posture angle of the vehicle 1 can be achieved. When navigational induction is carried out in the above-described manner, the direction of movement of tho vehicle is measured with the use of a rate gyroscope or the like means. At this moment the measurement results obtained by using the gyroscope or the like means can be properly corrected with reference to the direction of movement of the vehicle which is detected in compliance with the embodiment as illustrated in FIG. 7.

Figure 10:
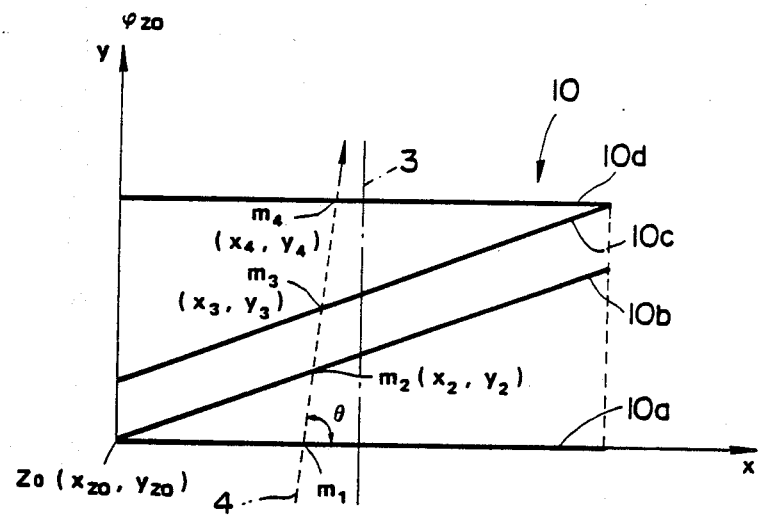

When ground marks 10 as illustrated in FIG. 10 are used, both the position of the vehicle 1 and the direction of movement of the same can be detected with the use of a single sensor 5.

As shown in FIG. 10, each of the ground marks 10 is constituted by two line segments 10a and 10d which are in parallel with one another and other two line segments 10b and 10c which are interposed between the two line segments 10a and 10d in such a manner as not to be in parallel with them. In the illustrated embodiment arrangement the line segments 10a and 10d extend at a right angle relative to the planned moving passage 3 or the vehicle 1 and the line segments 10b and 10c at least intersect the planned passage 3.

When it is assumed that the unattended vehicle 1 moves past the ground mark 10 and thereby the sensor 5 scribes a locus 4 as represented by a dotted line in FIG. 10, the locus 4 first intersects the line segment 10a at point $m_1$ and then it intersects the line segment 10b at point $m_2$. Further, it intersects the line segment 10c at point $m_3$ and finally it intersects the line segment 10d at point $m_4$. Coordinates $(x_2, y_2)$ of the intersection $m_2$ and coordinates $(x_3, y_3)$ of the intersection $m_3$ can be obtained by measuring four distances between the intersections, that is, $\overline{m_1 m_2}$, $\overline{m_2 m_4}$, $\overline{m_1 m_3}$ and $\overline{m_3 m_4}$.

Specifically, in the case where such a x-y coordinate system as illustrated in FIG. 10 is applied to the Z-shaped ground mark 2 in FIG. 2, among three intersections $P_1$, $P_2$ and $P_3$ where the locus 4 of the sensor 5 intersects the ground mark 2 coordinates (x, y) of the intersection $P_2$ are obtainable in accordance with the following formulas by utilizing distances $L_1$ and $L_2$ between the intersections.

$$x_1 = \frac{L_1}{L_1 + L_2} \cdot V \qquad (5)$$

$$y_1 = \frac{L_1}{L_1 + L_2} \cdot W$$

In FIG. 2, the coordinates $(X_O, Y_O)$ represent the origin of the coordinate system.

Incidentally, in the above-noted formulas V designates width of the ground mark 2 as seen in the x-direction, while Y designates a distance between line segments as seen in the y-direction.

Also coordinates $(x_2, y_2)$ of the intersection $m_2$ and coordinates $(x_3, y_3)$ in the x-y coordinate system in FIG. 10 can be obtained in compliance with the above-mentioned step of obtaining coordinate $(x_1, x_2)$ of point $P_2$ with the use of distances between the intersections $\overline{m_1m_2}$, $\overline{m_2m_4}$ and $\overline{m_1m_3}$, $\overline{m_3m_4}$.

An angle of $\theta_1$ formed by the ground mark 10 and the line segment 10d is given in accordance with the following formula (6).

$$\theta_1 = \tan^{-1}\frac{y_3 - y_2}{x_3 - x_2} \qquad (6)$$

When a reference coordinate position of the ground mark 10 is identified by $Z_0(x_{z0}, y_{z0})$, coordinates $(x_4, y_4)$ of the intersection $m_4$ are determined in accordance with the following formulas.

$$\left.\begin{array}{l} x_4 = \overline{m_3m_4}\cos\theta + x_3 + x_{z0} \\ y_4 = \overline{m_3m_4}\sin\theta + y_3 + y_{z0} \end{array}\right\} \qquad (7)$$

Accordingly, by detecting intersections $m_1$ to $m_4$ with the aid of the sensor 5 and measuring distances between the intersections, that is, $\overline{m_1 m_2}$, $\overline{m_2m_3}$ and $\overline{m_3m_4}$ by utilizing moving length detecting means such as length measuring ring or the like, an angle of $\theta_1$ can be obtained in accordance with the formula (6). Further after the angle of $\theta_1$ is obtained in this way, the position where the vehicle 1 is located can be obtained in accordance with the formula (7). Incidentally, line segments 10b and 10c are not necessarily parallel with each other.

Figure 11:
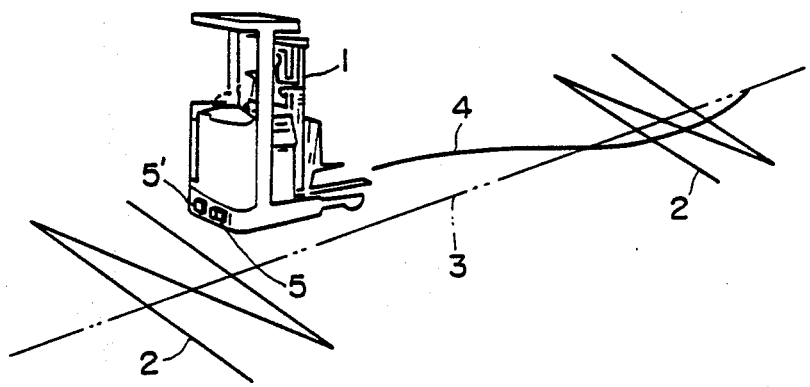

Next, description will be made below as to the case where the ground marks 2 as shown in FIG. 2 are detected by means of two sensors 5 and 5' in such a manner as illustrated in FIG. 11.

Figure 12:
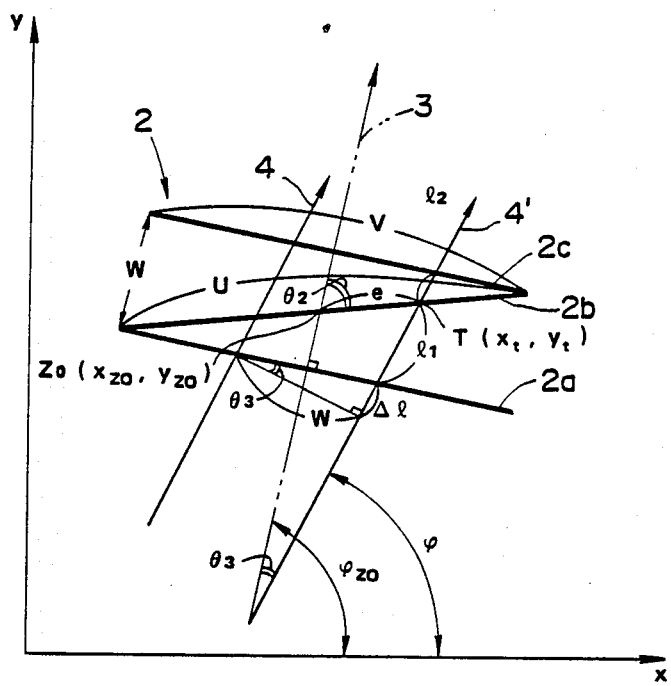

Referring to FIG. 12, loci of the sensors 5 and 5' which are scribed after the vehicle 1 moves past the ground mark 2 are identified by reference numerals 4 and 4', an intersection where the sensor 5' intersects the line segment 2b is identified by reference letter T, the direction of movement of the vehicle 1 is identified by reference letter $\phi$, a distance of movement of the vehicle 1 as measured from the time when the sensor 5 intersects the line segment 2a to the time when the sensor 5' intersects the line segment 2a is identified by $\Delta l$, a distance of movement of the vehicle as measured from the time when the sensor 5' intersects the line segment 2a to the time when it intersects the line segment 2b is identified by $l_1$, a distance of movement of the vehicle as measured from the time when the sensor 5' intersects the line segment 2b to the time when it intersects the line segment 2c is identified by $l_2$, a length of the line segment 2b is identified by U, a length of each of the line segments 2a and 2c is identified by V, and a distance between the line segments 2a and 2c is identified by W.

A distance e between the reference position $z_0(x_{z0}, y_{z0})$ of the ground mark 2 and the position T where the sensors intersects the line segment 2b can be represented in accordance with the following formula (8).

$$e = U\left(\frac{l_1}{l_1 + l_2}\right) - \frac{1}{2} \qquad (8)$$

Further, an angle of $\theta_3$ formed by the angle $\phi_{z0}$ indicative of the direction of extension of the ground mark 2 and the angle $\phi$ indicative of the direction of movement of the vehicle 1 can be represented in accordance with the following formula (9).

$$\theta_3 = \tan^{-1}\frac{\Delta l}{L} \qquad (9)$$

where L represents a distance between both the sensors 5 and 5'. Further, the angle $\phi_{z0}$ indicative of the direction of extension of the ground mark 2 can be represented in accordance with the following formula (10).

$$\phi_{z0} = \theta_3 + \phi \qquad (10)$$

Further, coordinates of the reference position $z_0$ $(x_{z0}, y_{z0})$ can be represented in accordance with the following formulas (11).

$$\left.\begin{array}{l} x_{z0} = x_t - e \cdot \cos(\phi_{z0} - \theta_2) \\ y_{z0} = y_t - e \cdot \sin(\phi_{z0} - \theta_2) \end{array}\right\} \qquad (11)$$

It should be noted that a condition of $\theta_2 = \text{const} = \tan^{-1}(c/b)$ is applicable to the above formulas and $x_t$ and $y_t$ represent coordinates of the position T.

Accordingly, by measuring $\Delta l$ with the use of length measuring means, the angle $\phi$ indicative of the direction of the vehicle 1 can be obtained from the formula (10) with reference to the above-noted $\Delta l$ and the angle $\phi_{z0}$ indicative of the direction of extension of the ground mark 2. Further, when the coordinates $(x_{z0}, y_{z0})$ of the reference position of the ground mark 2 and the angle $\phi_{z0}$ indicative of the direction of extension of the ground mark 2 are given and the distance e is measured with the use of length measuring means, the coordinates $(x_t, y_t)$ of the position T, that is, coordinates representative of the position where the vehicle 1 is located are obtainable from the formula (11).

Incidentally, in the case where a speed of movement of the vehicle 1 is kept constant, it is possible to measure distances of $\Delta l$, $l_1$ and $l_2$ with reference to time interval of generation of output signals from the sensor 5'.

Next, description will be made below as to a method of teaching a moving track for an unmanned vehicle as well as a method of guiding movement of the same in accordance with the present invention.

Figure 13:
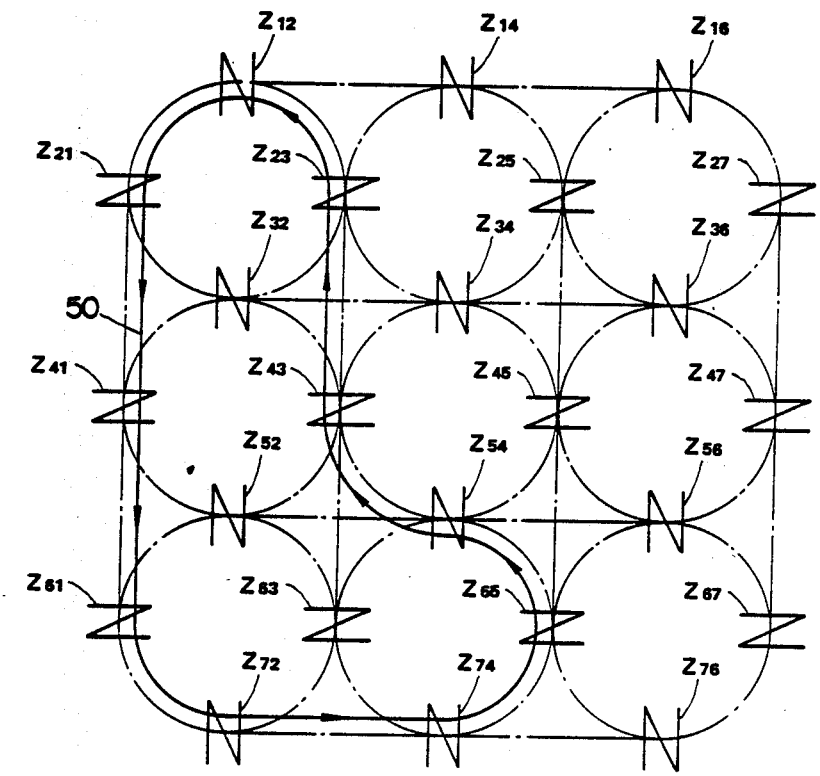
FIG. 13 is a schematic view which illustrates arrangement of ground marks within the moving area of a vehicle and a moving passage determined by some of the ground marks.

As shown in FIG. 13, a plurality of ground marks $Z_{12}$ to $Z_{76}$ are previously arranged within a moving area for the unmanned vehicle 1. It should be noted that each of the ground marks as mentioned above is placed at the predetermined position while extending in the predetermined direction.

Figure 14:
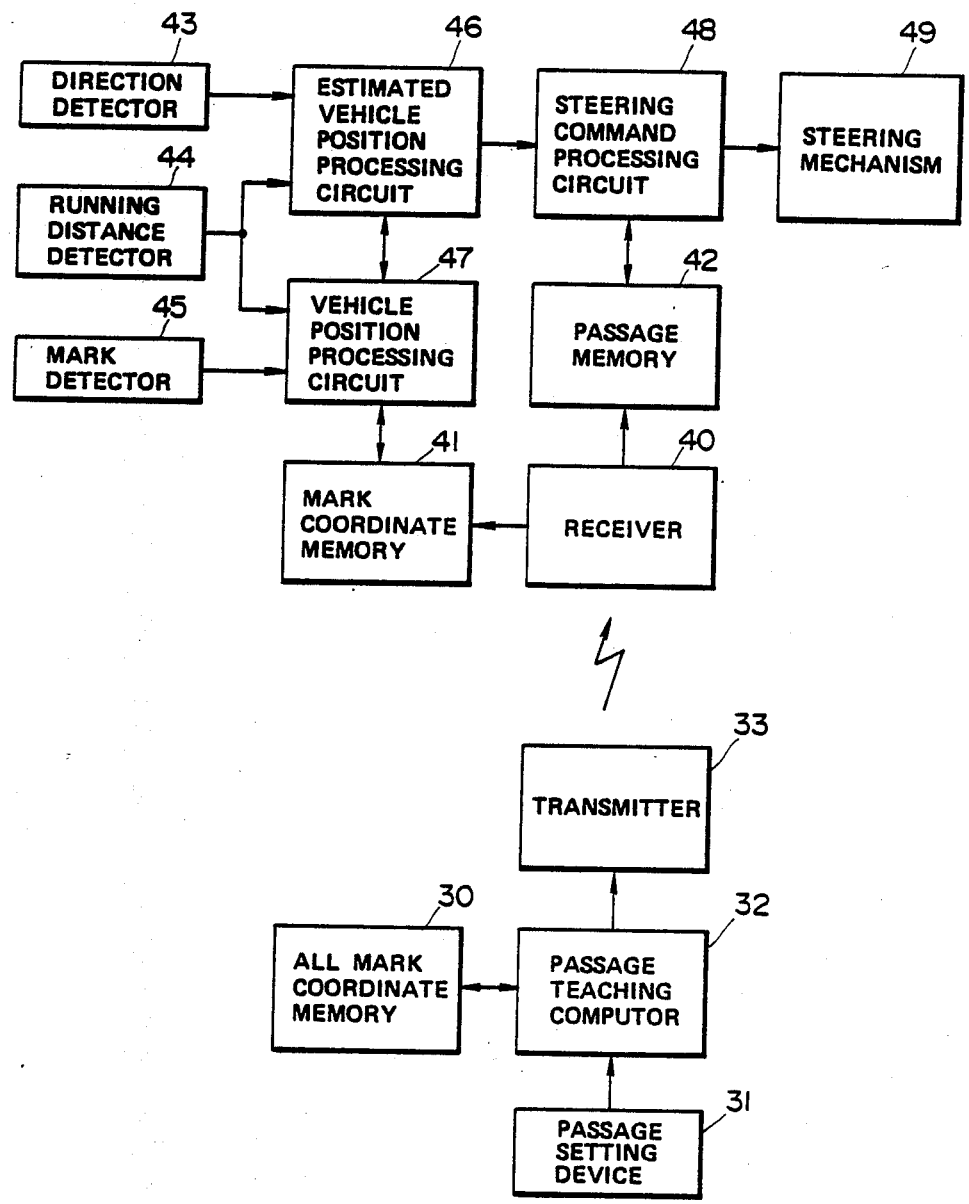
FIG. 14 is a block diagram illustrating one example of an apparatus for practicing a navigational guiding process for the vehicle.

FIG. 14 schematically illustrates one example of an apparatus for carrying out the method of teaching a moving passage for an unmanned vehicle as well as the method of guiding movement of the same. The of all ground marks $Z_{12}$ to $Z_{76}$ and the direction of extension of the same are stored in an all ground mark coordinate memory 30. A passage setting device 31 is manually operated when a moving passage is determined, and a required moving passage is determined by successively selecting and assigning the ground marks $Z_{12}$ to $Z_{76}$. For instance, in the case where a moving passage as represented by a real line 50 in FIG. 13 is to be set, a plurality of ground marks are assigned in accordance with the order of $Z_{21} \rightarrow Z_{41} \rightarrow Z_{61} \rightarrow Z_{72} \rightarrow Z_{74} \rightarrow Z_{65} \rightarrow Z_{54} \rightarrow Z_{43} \rightarrow Z_{23} \rightarrow Z_{1-2} \rightarrow Z_{21}$, wherein the ground mark $Z_{21}$ serves as starting point and terminating point.

A passage teaching computer 32 successively reads from the all mark coordinate memory 30 positional coordinates and direction for each of the ground marks assigned by the passage setting device 31 and thereby obtains positional coordinates of each ground point between the adjacent ground marks by linear or arch interpolation. Then, data indicative of positional coordinates and direction relative to each of the ground marks as well as data indicative of positional coordinates relative to each of ground points obtained by interpolation in that way are transmitted via a transmitter 33.

Next, description will be made below as to steps of processing to be performed by the passage instructing computor 32 or the like with reference to the flow chart of FIG. 15. When a ground mark $Z_l$ ($Z_{21}$ in the case of the track 50) serving as starting point is inputted at Step 100, data indicative of its coordinates ($x_{z1}$, $y_{z1}$) and data indicative of direction $\phi_{z1}$ are transmitted from the transmitter 33 (Step 101). Next, i is rewritten to 2 (Step 102) and data indicative of coordinates ($x_{zi}$, $y_{zi}$) and direction ($\phi_{zi}$) relative to the assigned ground mark $Z_i$ are inputted (step 103).

In the case when this inputting fails to be effected within a predetermined period of time, this flow is completed. On the contrary, in the case where inputting has been effected within a predetermined period of time, the program goes to Step 105 (Step 104). At Step 105 comparison is made between direction $\phi_{zi}$ of the ground mark which has been inputted at this time and direction $\phi_{zi-1}$ of the ground mark which was inputted at the preceding time. When it is found that the former is identical to the latter, the program goes to Step 106. If not, the program goes to Step 107.

At Step 106 a linear line extending between ground marks $z_i$ and $Z_{i-1}$ is interpolated by series of ground points, while at Step 107 both the ground marks $z_i$ and $z_{i-1}$ are connected to one another by an assigned arch and then interpolated by a series of ground points.

Specifically, when it is assumed that for instance, $Z_i$ ground marks $Z_i$ and $Z_{i-1}$ are ground marks $Z_{61}$ and $Z_{41}$ in FIG. 13, the intermediate area between both the ground marks is interpolated by a series of ground points and positional coordinates relative to each ground point among the series of ground points are obtained at Step 106.

Similarly, in the case where ground marks $Z_i$ and $Z_{i-1}$ are ground marks $Z_{72}$ and $Z_{61}$ in FIG. 13, the intermediate area between both the ground marks is interpolated with respect to an arch by a series of ground points and positional coordinates relative to each ground point on the thus interpolated arch are obtained at Step 107.

Coordinate data indicative of position of each ground point among the series of ground points between the ground marks $Z_i$ and $Z_{i-1}$ as obtained by interpolation, coordinate data ($x_{zi}$, $y_{zi}$) indicative of position of the ground mark $Z_i$ and data indicative of direction $\phi 0_z$ of the same are transmitted from the transmitter 33 at Step 108.

After i has been incremented by 1 at Step 109, the step is caused to return to Step 103.

Figure 15:
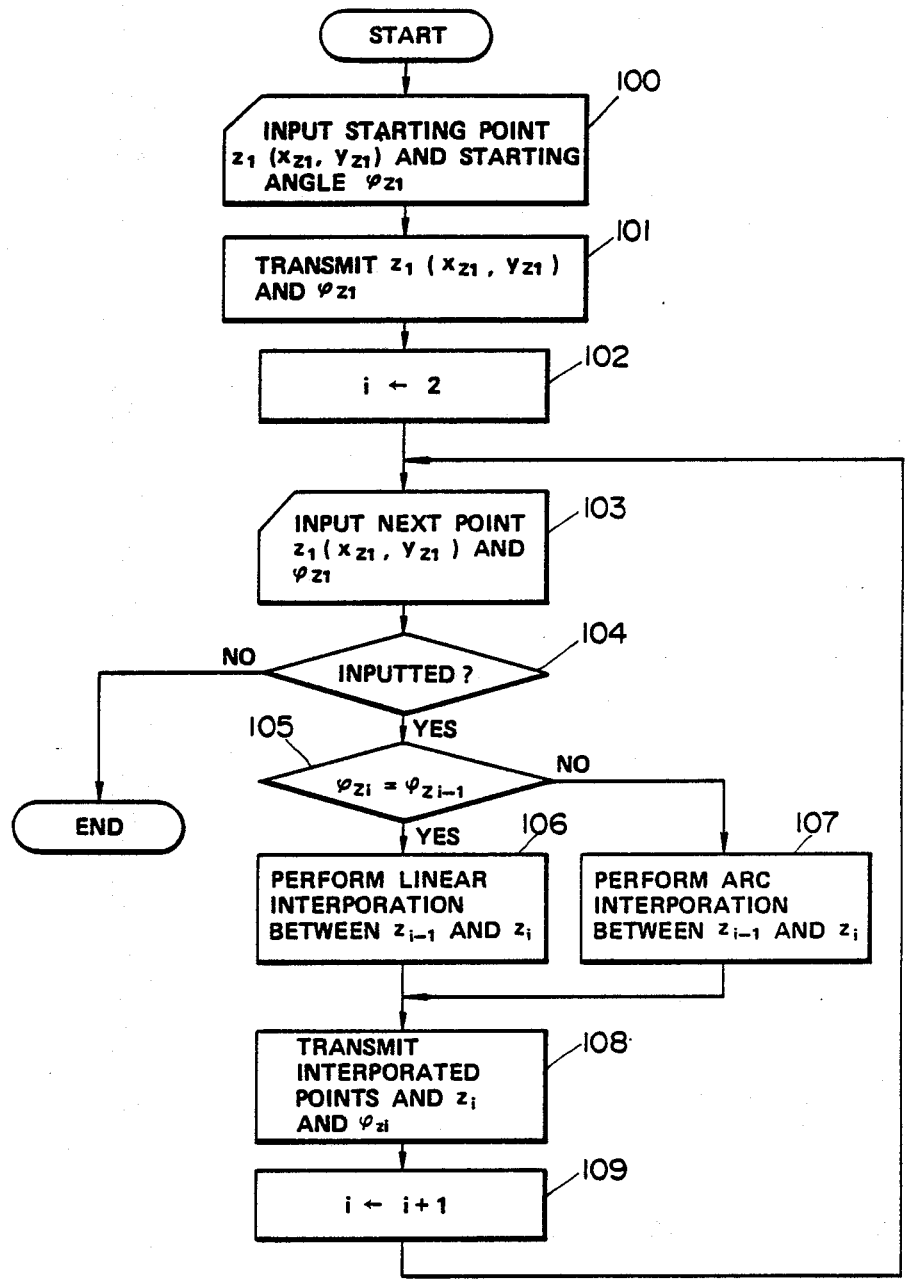
FIG. 15 is a flow chart which illustrates operation of the apparatus in FIG. 14.

Thus, in the case where an assigned moving passage is the moving passage 50 as shown in FIG. 15, data indicative of positional coordinates and direction of the ground marks $Z_{21}$, $Z_{41}$, $Z_{61}$ --- $Z_{12}$, $Z_{21}$ and data indicative of positional coordinate of each ground point between the adjacent ground marks are transmitted from the transmitter 33.

The above-mentioned data transmitted from the transmitter 33 are received by a receiver 40 mounted on the vehicle 1. Data indicative of coordinates and direction of each of the ground marks on the moving passage are successively stored in a mark coordinate memory 41, while coordinate data indicative of position of each ground point between the adjacent ground marks are successively stored in a passage memory 42.

Thus, teaching of the passage inclusive position and direction of extension of each of the ground marks has been completed by way of the steps as mentioned above.

Next, description will be made below as to control for causing the unmanned vehicle 1 to move along a predetermined passage (for instance, the passage in FIG. 15) by using the stored data relative to the passage.

Referring to FIG. 14, a direction detector 43 is constructed in the form of a rate gyroscope which is adapted to detect direction of movement of the vehicle 1 by detecting an amount of displacement (angular speed) in the direction of movement of the vehicle 1 and integrating it. A running distance detector 44 detects a distance of movement of the vehicle 1 which moves momentary by using the number of revolutions of wheels or the like. Further, a mark detector 45 detects existence of line segments constituting the ground mark when the vehicle 1 moves across the ground mark. Incidentally, this detector 45 corresponds to two sensors 5 and 5' in FIG. 11.

A estimated vehicle position processing circuit 46 is effective for estimating the current position of the vehicle 1 in response to signals indicative of direction and running distance of the vehicle 1 which are momently outputted from a direction detector 43 and a running distance detector 44 and outputs a signal indicative of the estimated position of the vehicle 1.

A vehicle position processing circuit 47 obtains the position of the vehicle 1 relative to the ground mark with reference to each of output signals from the running distance detector 44 and a mark detector 45 and moreover specifically designates the ground mark detected by the ground mark detector 45 with reference to signals outputted from the estimated position processing circuit 46 to indicate an estimated position of the vehicle 1. Then, data indicative of positional coordinates and direction of extension of the specifically designated ground mark are read from a memory 41 and the current correct position of the vehicle 1 in a x-y coordinate system representative of the passage thereof is obtained from the thus read data with reference to the position of the vehicle 1 relative to the ground mark. Thereafter, the estimated position obtained with the aid of the vehicle estimated position processing circuit 46 is corrected to the above-mentioned correct position. It should be noted that this position correction is carried out every time the vehicle moves past the ground mark.

A steering command processing circuit 48 successively reads coordinate data relative to a series of ground points on the passage stored in the passage memory 42, that is, coordinate data relative to each ground point between the adjacent ground marks obtained by interpolation in response to signals added from the vehicle estimated position processing circuit 46 to indicate the estimated position of the vehicle 1 so that a steering command is issued to a steering mechanism 49 in order that the vehicle 1 follows the series of ground points. Incidentally, when a distance between the estimated position and the position of target ground points (the position of the series of ground points) is reduced shorter than a predetermined distance or the aforesaid distance becomes elongated gradually, the steering command processing circuit 48 sets as a new target ground point a ground point located next to the stored series of ground points. Description will be made later as to the setting of the new target ground point.

According to the embodiment of the invention as described above a required passage can be taught merely by successively designating ground marks, that is, without any necessity for allowing the vehicle to move and moreover changing of the passage can be easily achieved. Further, the estimated position of the vehicle 1 is corrected to a proper position at every time the vehicle 1 moves past the ground mark while movement of the vehicle 1 is guided. Accordingly, movement of the vehicle 1 can be guided with high accuracy even when the passage has a long length.

Incidentally, the present invention should not be limited only to the above-mentioned embodiment in which the passage is taught via communication means. Alternatively, the passage for the vehicle 1 may be guided with the aid of a calculator or the like means mounted on tho vehicle 1 to instruct the moving passage therefor. Further, since the direction of movement of the vehicle can be detected when it moves past the ground mark, this leads to a result that detection output from the direction detector 43 can be corrected.

Next, description will be made below as to another method of teaching a passage.

This method of teaching a passage consists in that for instance, Z-shaped ground marks 2 as illustrated in FIG. 11 are disposed at proper positions in a moving area of the vehicle 1, movement of the vehicle 1 is manually guided so as to allow it to move past the ground marks 2 and the position of each ground point on the moving passage is stored as a series of ground points with reference to the track of estimated position of the vehicle 1 at that time and that estimated positional coordinates of the ground mark on which the vehicle is adapted to move is obtained with reference to estimated position of the vehicle and the thus obtained estimated positional coordinates are stored as coordinate of the ground mark.

Now, in the case where the vehicle 1 moves from position $P_a(x_a, y_a)$ to position $P_b(x_b, y_b)$ for a very short period of time $\Delta t$, position $P_b(x_b, y_b)$ is represented by the following formulas (12), when it is assumed that the direction of movement of the vehicle at position $P_a$ is identified by $\phi_a$ the direction of movement of the same at position $P_b$ is identified by $\phi_b$ and a distance between position $P_a$ and $P_b$ is identified by l.

$$x_b = x_a + l\cos\frac{\phi_a + \phi_b}{2} \quad (12)$$

$$y_b = y_a + l\sin\frac{\phi_a + \phi_b}{2}$$

As will be apparent from the above formulas, the current position of the vehicle 1 can be estimated by totaling the initial position and the latter changed position.

Here, description will be made as to a principle for estimating position and direction of extension of the ground mark from the vehicle.

For instance, when the sensors 5 and 5' mounted on the vehicle 1 as shown in FIG. 11 move across the ground mark 2 while scribing loci 4 and 4', positional coordinates $Z_0(x_{z0}, y_{z0})$ and direction $\phi z0$ are represented in accordance with the formulas (10) and (11). Accordingly, direction $\phi_{z0}$ of the ground mark 2 can be estimated from the formula (10) by obtaining an angle of $\theta_3$ on the basis of the formula (9) and then detecting direction $\phi$ of movement of the vehicle from the vehicle. Further, by obtaining distance e on the basis of the formula (8) and estimating position T $(x_t, y_t)$ on the vehicle side at the time when the vehicle moves past the ground mark, position $Z_0(x_{z0}, y_{z0})$ of the ground mark 2 can be estimated with reference to the formula (11).

Further, this embodiment in which the moving passage is taught while movement of the vehicle 1 is guided manually will be described below in association with a teaching apparatus as exemplified in FIG. 17. It should be noted that same or similar elements as those in FIG. 14 will be identified by same reference numerals.

According to this embodiment the ground marks 2 are previously disposed at a plurality of positions within a moving area of the vehicle 1 in the above-described manner and movement of the vehicle is manually guided so as to allow it to move across them whereby running locus of the vehicle is taught as moving passage.

Figure 17:
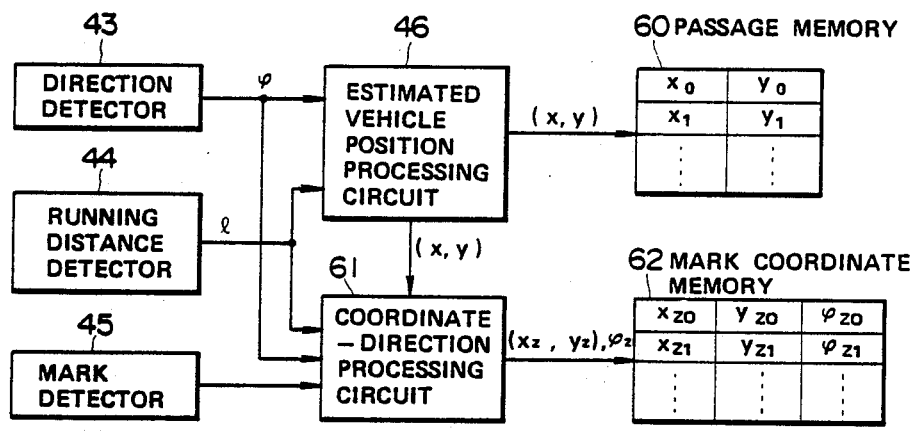
FIG. 17 is a block diagram which schematically illustrating an apparatus for teaching a moving passage of the vehicle.
Figure 18:
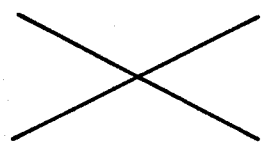
Figure 19:
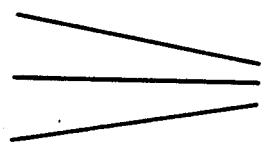

Referring to FIG. 17, estimated position processing circuit 46 outputs to a passage memory 60 data indicative of estimated position (x, y) of the vehicle while movement of the latter is guided manually and thereby positional coordinates relative to each ground point on the moving passage of the vehicle are successively stored in the memory 60. Namely, data indicative of passage of the vehicle are stored therein in the form of a series of ground points.

On the other hand, a coordinate-direction processing circuit 61 estimates coordinates $(x_z, y_z)$ and direction $\phi_{z0}$ of the ground mark in accordance with the formulas (8) to (11) so that data indicative of the thus estimated coordinates and direction are outputted to a mark coordinate memory 62. Thus, coordinate data and direction data relative to the ground mark are successively stored in the memory 62 in such a manner as illustrated in the drawing.

When the vehicle is caused to move once along a required moving passage in that way, teaching of the moving passage inclusive the position and direction of the ground mark is completed.

On completion of teaching of the passage, movement of the vehicle along the instructed moving passage can be guided in the same manner as in the foregoing embodiment. Namely, data $(x_0, y_0)$, $(x_1, y_1)$ ---- stored in the memory 60 are successively read therefrom as target position whereby movement of the vehicle along the series of ground points is guided.

Figure 16:
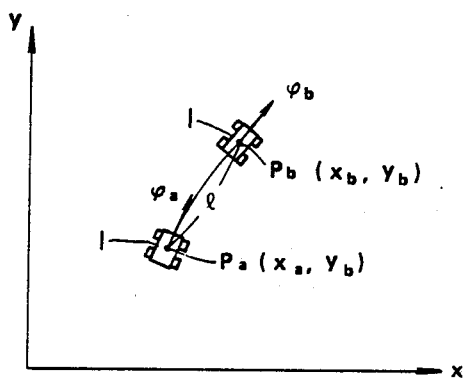
FIG. 16 is a schematic view illustrating a principle for estimating the position of the vehicle.

Further, the estimated position of the vehicle is corrected with the use of data $(x_{z0}, y_{z0})$, $(x_{z1}, y_{z1})$ ---- and data $\phi_{z0}, \phi_{z1}$ ---- each of which is stored in the memory 62, when the vehicle moves past the ground mark. Namely, the position of the vehicle is estimated in accordance with the principle as illustrated in FIG. 16 and an estimated value is corrected in dependence on the content of the memory 62 when the vehicle moves past the ground mark.

Incidentally, Z-shaped ground marks 2 are employed for the embodiment as illustrated in FIG. 11. Alternatively, a ground mark as illustrated in FIG. 8, 10 and 18 to 20 may be used. In short, any combination of ground mark by means of which the position of a vehicle can be detected and a sensor is employable.

Accordingly, for instance, a landmark by means of which direction of movement of a vehicle can be detected is used as ground mark and a television camera for photographing the landmark is used as sensor so that the position of the vehicle can be detected with reference to the position and direction of the landmark appearing on the screen of the television.

Figure 20:
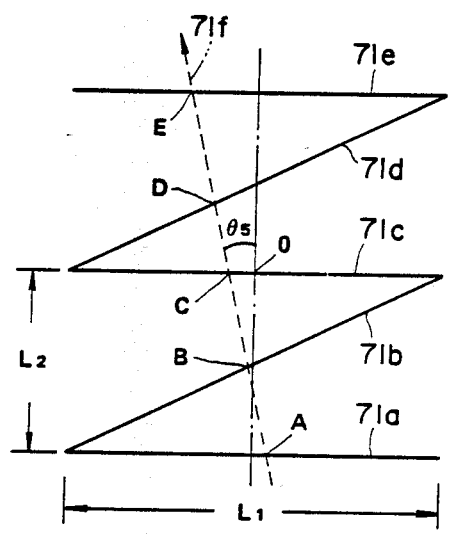
Figure 21:
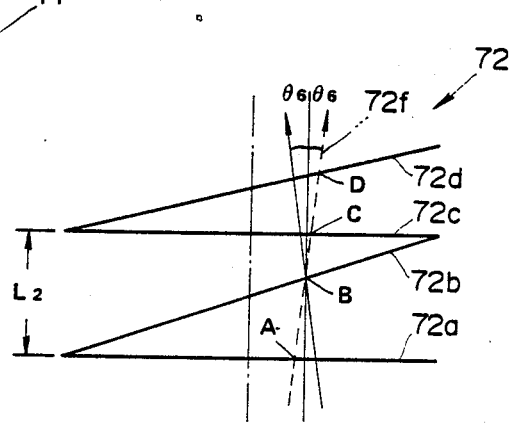

Here, ground marks 71 and 72 as shown in FIGS. 20 and 21 will be described briefly. Line segments $71a$ to $71e$ constituting the ground mark 71 include intersections A, B, C, D and E at which they intersect a locus $71f$ of a sensor for detecting them. When length of line segments $\overline{AB}$, $\overline{BC}$, $\overline{CD}$ and $\overline{DE}$ between the adjacent intersections is represented by $d_1$, $d_2$, $d_3$ and $d_4$, positional deviation $\overline{CO}$ of the vehicle and inclination $\theta_5$ are obtainable in accordance with the following formulas (13).

$$\overline{CO} = L_1 \left( \frac{d_3}{d_2 + d_3} - \frac{1}{2} \right) \quad (13)$$

$$\theta_5 = \tan^{-1} \frac{L_2 \cdot K}{L_1(1 - K)}$$

It should be noted that K is defined in the form of $d_2/(d_1+d_2)+d_3/(d_3+d_4)$, $L_1$ represents a length of the line segment $71a$ and $L_2$ represents a distance between both the line segments $71a$ and $71c$.

The ground mark 72 as illustrated in FIG. 21 is constituted by four line segments $72a$ to $72d$ among which only line segments $72a$ and $72c$ extend in parallel with one another. The line segments $72a$ to $72d$ have intersections A, B, C and D at which they intersect a locus $72f$ of the sensor for detecting them. By measuring a distance $\overline{AB}$ and a distance $\overline{BC}$, the position where the intersection B is located can be obtained in the same manner as described above. Further, by measuring a distance $\overline{AC}$, a declination angle $\theta_6$ of the vehicle can be obtained in accordance with the following formula (14).

$$\theta = \cos^{-1} \frac{L_2}{\overline{AC}} \quad (14)$$

It can not be specifically determined by the declination angle $\theta_6$ obtained in the above-described manner whether or not the vehicle is inclined rightward or leftward relative to the direction of movement of the vehicle. However, the direction of inclination of the vehicle can be specifically determined by measuring a distance $\overline{CD}$ or $\overline{AD}$.

Figure 22:
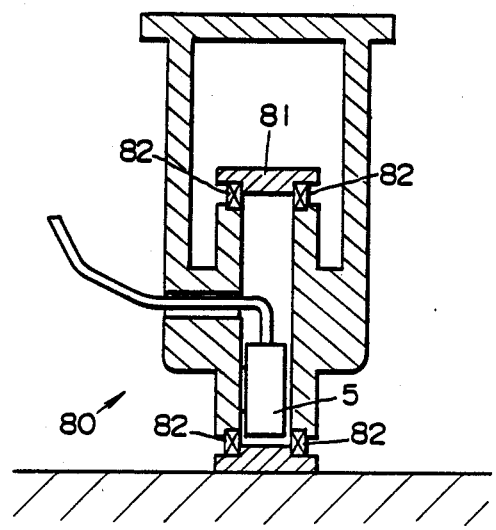
FIGS. 22 and 23 are a vertical sectional view and a side view illustrating a wheel in which a sensor is accommodated.
Figure 23:
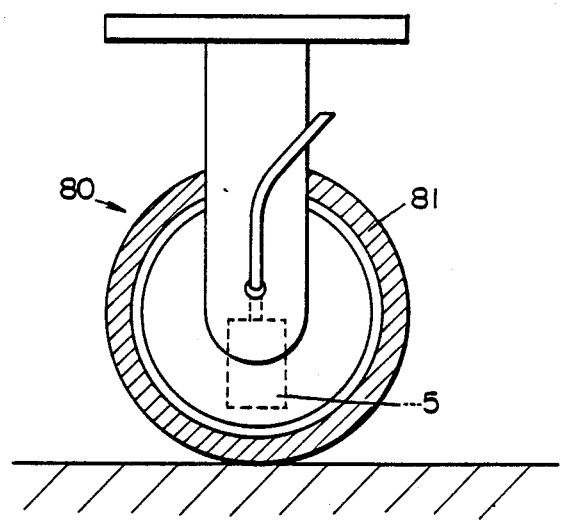

As shown in FIG. 1, the sensor 5 is mounted on the side wall of the vehicle 1. However, in the case where the sensor is constructed in such a manner as to magnetically detect the ground mark, it can be accommodated within the hollow space of a wheel 80 as shown in FIGS. 22 and 23.

In the drawings reference numeral 81 designates a wheel surface structure made of rubber or the like material which is rotatably supported by means of bearings 82.

When the sensor 5 is an eddy current type sensor, it is constructed by coils and it is held within the hollow space of the wheel in the downward direction. In this case a ground mark made of metallic material, ferrite or the like is subjected to function of magnetic field, causing alternate current to flow through the sensor 5. When the sensor 5 reaches the position where it is located above the ground mark, an intensity of electric current which flows through the sensor 5 varies under the effect of electromagnetic field whereby the fact that the sensor 5 is located above the ground mark can be detected.

Incidentally, in the case where the ground mark is constructed to generate a magnetic field, means for detecting the magnetic field is employed for the sensor 5.

Figure 24:
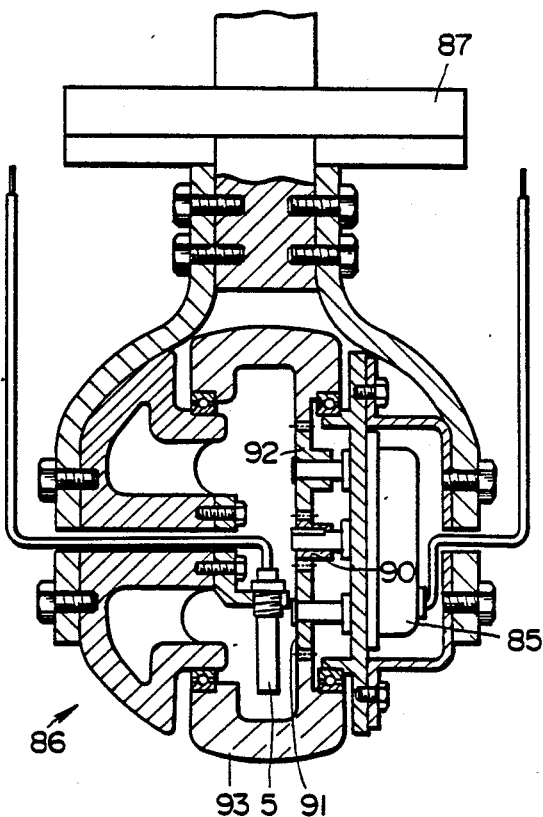
FIG. 24 is a vertical sectional view illustrating arrangement of a sensor in a wheel with rotating means incorporated therein.

FIG. 24 shows a wheel 86 in which a motor 85 serving as driving force power is accommodated. The wheel 86 is fixedly secured to the housing of the vehicle via a support column 87, but it can be used as a steering wheel by connecting it to a steering rod (not shown) on the housing side.

When the vehicle is provided with a pair of wheels, not only acceleration and deceleration but also steering can be effected by controlling the number of revolutions of each of the motors 85.

As will be apparent from the drawing, rotational force of the motor 85 is transmitted to the surface structure 93 via a plurality of gears 90, 91 and 92.

Also the sensor 5' as shown in FIG. 11 can be accommodated within the hollow space of the wheel in the same manner and even in the case where the wheel is a so-called caster, the sensor 5 can be accommodated in this caster. Further, the vehicle may be provided with a wheel which does not come in contact with the ground so that a sensor is accommodated in the aforesaid wheel. In this case it is recommended to interpose spring means between the wheel and the housing of the vehicle, because an occurrence of raising of the wheel can be avoided when the wheel rides on a certain projection on the ground surface.

When the sensor 5 is disposed within the hollow space of a wheel, an occurrence of damage due to existence of a projection or the like on the ground surface can be prevented. This is because of the fact that the sensor 5 rides over the projection or the like without fail.

Next, description will be made in more details as to how the ground mark as identified by reference numerals 2, 6 and 10 is constructed. In view of the fact that the vehicle moves across the ground mark repeatedly, it is recommended that the ground mark is so constructed that little or no wear and damage take place.

Further, in order to assure that the ground mark is placed on the ground surface having ruggedness, it is preferable that the ground mark has flexibility.

Figure 25:
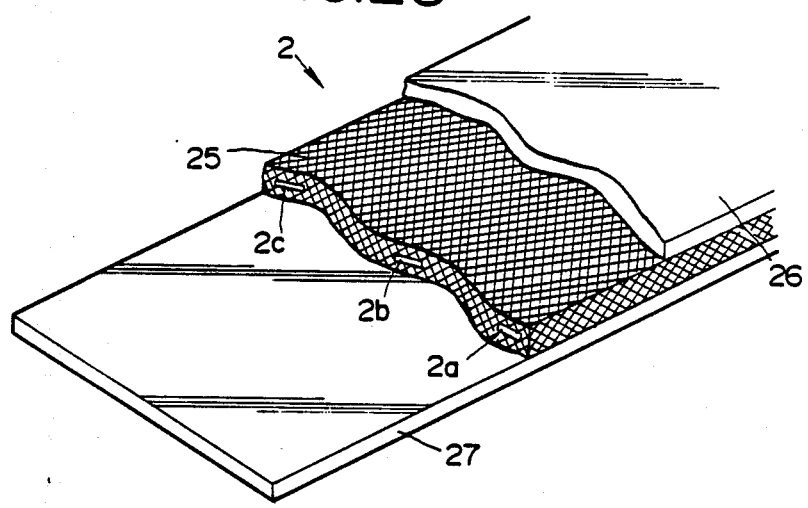
FIG. 25 is a perspective view illustrating the structure of a ground mark.

The Z-shaped ground mark 2 as shown in FIGS. 2 and 11 is concretely constructed as illustrated in FIG. 25.

The ground mark 2 is so constructed that line segments 2a, 2b and 2c made of flexible material are embedded in a fibrous plate 25 having also flexibility and rubber sheets 26 and 27 are adhesively attached to both the upper and lower surfaces of the fibrous plate 25.

Employment of material for the line segments 2a, 2b and 2c is restricted by kind of sensor to be employed. For instance, in the case where the sensor is constructed in the form of a metal detector, aluminum alloy or the like material is employed as material for the line segments, while in the case where the sensor is an eddy current type sensor, stainless steel or the like material is employed therefor. Chemical fiber or natural fiber is usable as material for the fibrous plate 25 but it is necessary to select material for the fibrous plate 25 in such a manner that the latter itself does not prevent detection of the line segments 2a, 2b and 2c. For instance, when the sensor detects fluctuation in permeability, non-magnetic material is employed, while when the sensor detects fluctuation in conductivity, non-conductive material is employed as material for the fibrous plate 25.

Incidentally, by constructing ground marks other than the ground mark 2 in the same manner as mentioned above, improved durability is assured.

When output signal from the sensors 5 and 5' varies due to vibration of the vehicle or the like factor, they fail to correctly detect the line segments constituting the ground mark.

Usually, the time when the sensors 5 and 5' detect the line segments of the ground mark corresponds to the time when sensor output reaches a peak value, the time when sensor output is being raised or the time when sensor output is lowering from the peak value.

Accordingly, when sensor output varies due to vibration of the vehicle, it is often found that the position where the peak value is reached is offset from the center of the line segments or raising or lowering position is offset from the correct position. Thus, the time when the sensors move past the center position of the line segments can not be exactly detected, resulting in accuracy in detection of the position of the vehicle being lowered.

To inhibit an occurrence of such malfunctions as mentioned above, it is recommendable that signal processing is effected in the following manner.

Figure 27:
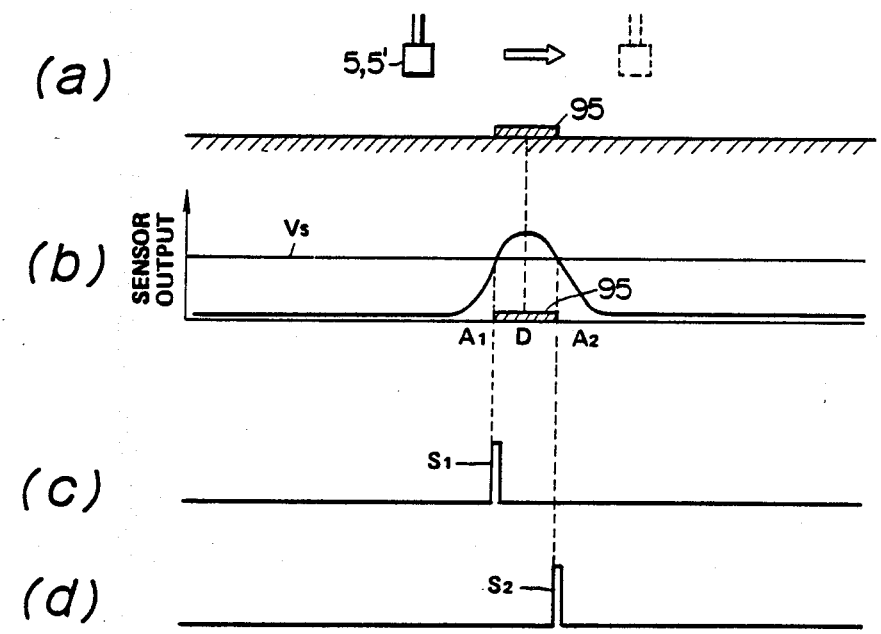
FIGS. 27a–27d show a timing chart showing the operation of the apparatus in FIG. 26.

As an unmanned vehicle moves, the sensor 5 or 5' outputs a detection signal as shown in FIG. 27(b) in dependence on the positional relation relative to a line segment 95 as shown in FIG. 27(a). As is apparent from FIG. 27(b), the detection signal has a symmetrical wave form relative to the center position D of the line segment 95.

Figure 26:
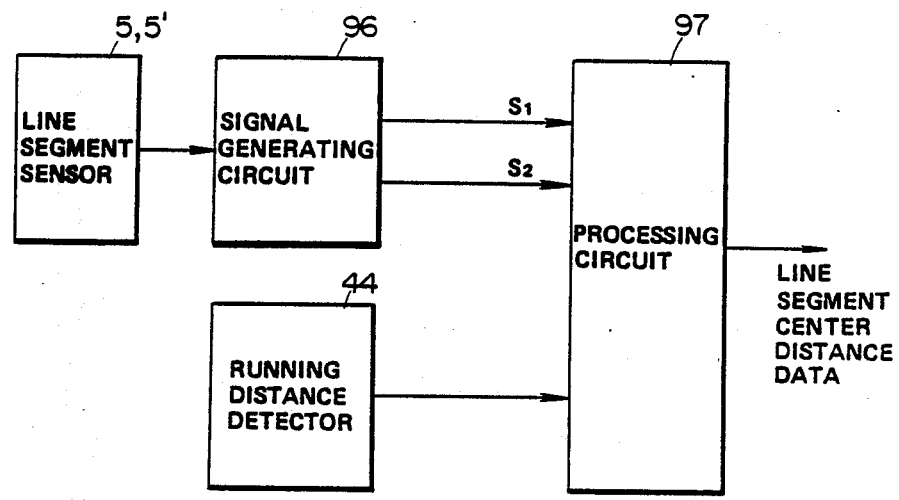
FIG. 26 is a block diagram showing an apparatus for detecting that a sensor moves past the center of a line segment constituting the ground mark.

A signal generating circuit 96 as shown in FIG. 26 has a suitable threshold Vs as shown in FIG. 27(b) which is smaller than the peak value of a detection signal generated by the sensor 5 and larger than an output level at the time when the line segment is detected. Further, it outputs a signal $S_1$ shown in FIG. 27(c) at the time when the detection signal generated by the sensor 5 becomes larger than the threshold Vs and moreover output a signal $S_2$ shown in FIG. 27(d) at the time when the detection signal of the sensor 5 becomes smaller than the threshold Vs.

Both the signal $S_1$ and $S_2$ are inputted into a processing circuit 97, while a signal indicative of distance of movement of the vehicle 10 is inputted thereinto from the distance detector 44 as shown in FIGS. 14 and 17.

The processing circuit 97 receives from the distance detector 44 signals indicative of movement distances $A_1$ and $A_2$ at the time when the signal $S_1$ and $S_2$ are inputted thereinto whereby a movement distance D of the unattended vehicle at the time when the sensor 5 moves past the center position of the line segment 95 is obtainable by the following formula (15).

$$D = \frac{A_1 + A_2}{2} \tag{15}$$

Then, a difference $|A_1 - A_2|$ between the movement distances $A_1$ and $A_2$ is obtained and when it is found that this difference is substantially identical to a width of the line segment 95, it is determined that the sensor 5 has moved past the line segment 95. Thereafter, a signal indicative of the distance D obtained by the formula (15) is outputted therefrom as movement distance of the unattended vehicle at the time when the sensor 5 moves past the center position of the line segment 95.

Figure 28:
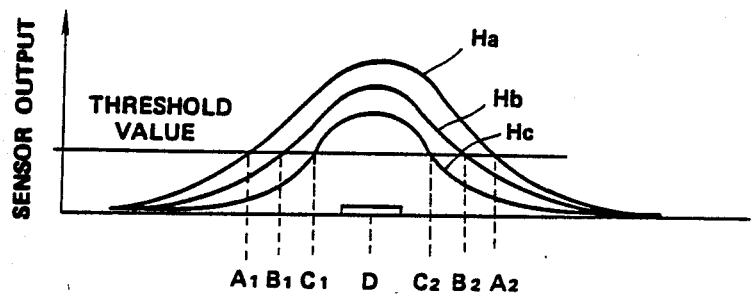
FIG. 28 is a wave form diagram illustrating output signals from a sensor which is mounted at different levels.

In FIG. 28 reference letters A, B and C designate an output signal from the sensor 5 respectively in the case where the sensor 5 is placed at a different height.

The processing circuit 97 executes processing for each signal in accordance with the following formula (15). Each of the results obtained by processing represents a movement distance D indicative of the center position of the line segment 95.

This means that the distance of movement of the vehicle can be exactly detected irrespective of the position where the sensor 5 is placed above the ground, that is, detection accuracy in distance of movement is not adversely affected by vibration of the vehicle.

Figure 29:
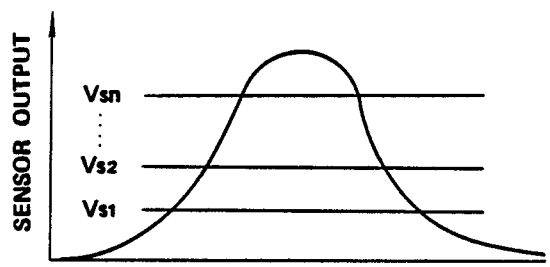
FIG. 29 is a wave form diagram of an output signal with a plurality of thresholds placed thereon.

Further, by setting n thresholds $V_{s1}, V_{s2}, \cdots V_{sn}$ as shown in FIG. 29 and then obtaining an average value D' among movement distances $D_1, D_2 \cdots D_n$ at the center position of the line segment obtained with respect to each of the thresholds in accordance with the following formula (16), a distance of movement at the center position of the line segment can be exactly obtained.

$$D = \frac{\sum_{i=1}^{n} Di}{N} \tag{16}$$

Figure 30:
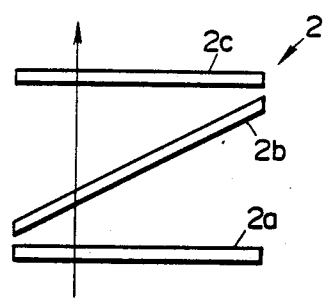
FIG. 30 is a schematic view illustrating one example of ground mark and a moving track of the vehicle which moves across the ground mark.

Next, description will be made below as to concrete data obtained in the case where a vehicle moves across a Z-shaped ground mark 2 as shown in FIG. 30 in the direction as identified by an arrow mark.

Each of line segments 2a, 2b and 2c constituting the ground mark 2 shown in the drawing is made of aluminum tape having a width of 5 cm and a distance between both the line segments 2a and 2c is set to 80 cm. A metal detecting sensor is employed for the sensor for this case and a speed of the vehicle (having, for instance, a total length of 2,130 mm) when the latter moves past the ground mark 2 is set to 4 Km/h.

Figure 31:
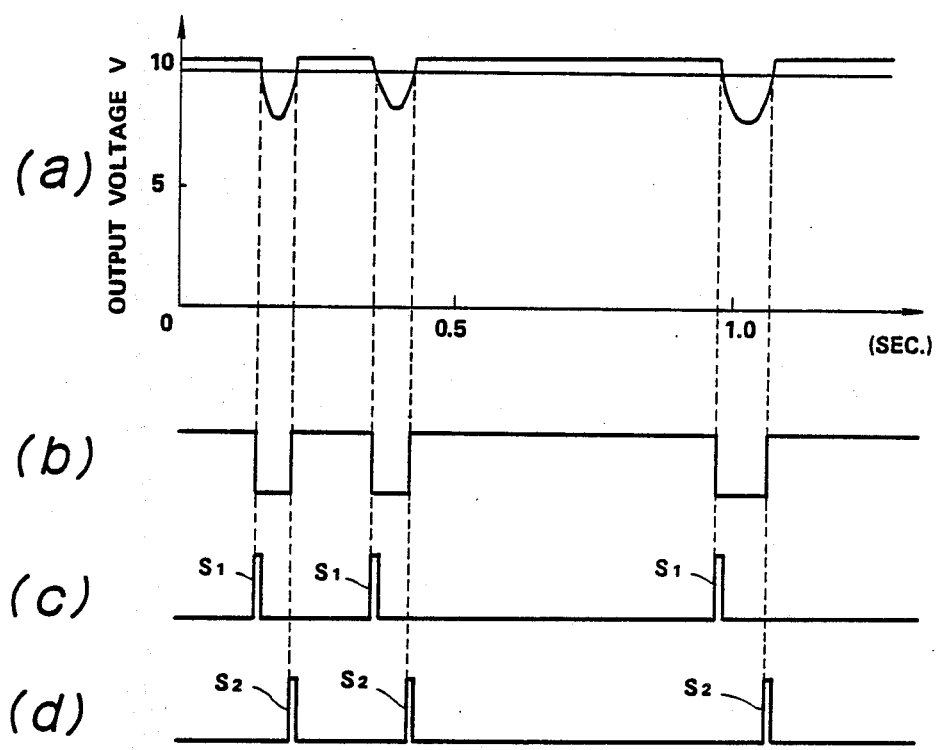
FIGS. 31a–31d show a time chart illustrating function of the apparatus in FIG. 27 when the ground mark as shown in FIG. 30 is used.

Output voltage V from the sensor varies as illustrated in FIG. 31(a). As is apparent from the drawing, output voltage decreases from a saturated value (for instance, 10V) at every time when the vehicle moves past the line segments 2a, 2b and 2c. It should be noted that wave forms of output voltage appearing when it moves past them are different from one another due to movement of the vehicle in the vertical direction and inclination of the same.

Figure 32:
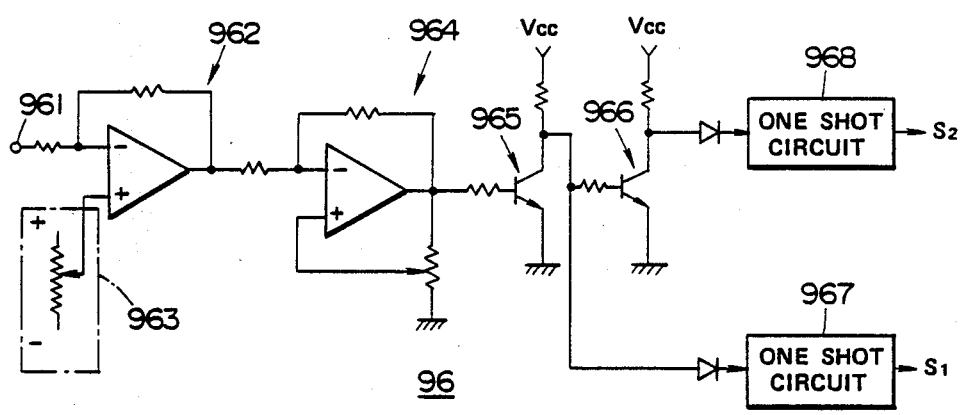
FIG. 32 is a circuit diagram illustrating a concrete example of the interruption signal generating circuit in FIG. 27.

Incidentally, the signal generating circuit 96 shown in FIG. 26 is constructed, for instance, as illustrated in FIG. 32. In the signal generating circuit 96 voltage signal from the sensor is applied to the minus side input of a subtraction circuit 962 via an input terminal 961. Further, threshold voltage (9V) is applied to the plus side input of the subtraction circuit 962 from a threshold setting unit 963.

The subtraction circuit 962 makes subtraction with the above-mentioned two inputs and thus obtained subtraction signal is applied to schmitt circuit 964. This schmitt circuit 964 eliminates fine ripple noises included in the subtraction signal in response to receiving of the latter and a signal, as shown in FIG. 31(b), is then outputted therefrom.

When a logic level of the output signal from schmitt circuit 964 varies from "H" to "L", a one shot circuit 967 is triggered via a transistor 965 so that the one shot circuit 967 outputs a signal $S_1$ as shown in FIG. 30(c). On the other hand, when output signal from schmitt circuit 964 varies from "L" to "H", a one shot circuit 968 is triggered via transistors 965 and 966 so that the one shot circuit 968 outputs a signal $S_2$.

In the above-mentioned embodiment a distance signal $S_2$ of movement of the vehicle at the time when the sensor moves past the center position 95 (2a, 2b, 2c) is obtained. Alternatively, the time point (time) when the sensor moves past the center position of the line segment 95 may be detected in the case where the vehicle moves at a constant speed.

Next, description will be made below as to concrete content relative to controlling in the case where movement of a vehicle is guided with the aid of teaching data, for instance, positional data relative to each point stored in the passage memory 42 in FIG. 14 or the memory 60 in FIG. 17.

For instance, a gyrocompass usable for an ocean-going ship is employed for the direction detector 43 as shown in each of the drawings. The distance detector 44 is typically constituted by a pulse encoder operatively associated with wheels on the vehicle 1 and means for counting output pulses from the encoder.

The existent position (x, y) of the vehicle in the x-y coordinate system can be obtained in accordance with the following formulas (17) when the direction detector 43 and the distance detector 44 are used to this end.

$$x = \Sigma \cos\phi \cdot \Delta s + x_0$$
$$y = \Sigma \sin\phi \cdot \Delta s + y_0 \quad (17)$$

where $\Delta s$ represents amount of movement of the vehicle per one sampling time, $\phi$ does an inclination of the vehicle relative to x-coordinate (relative to the direction of movement of the vehicle), and $(x_0, y_0)$ does coordinate of the starting point of the vehicle.

Incidentally, as means for measuring the direction of movement of the vehicle 1, gyrocompass, terrestrial magnetism vibration gyro, rate gyro, laser gyro and device for sensing the direction of movement by difference in number of rotations of left-handed and right-handed wheels are proposed. Further, the existent position of the vehicle may be measured directly by a radio wave measuring method.

Next, a distance between the adjacent ground points and other items will be examined below in the case where the moving passage is instructed in the form of a series of ground points on the moving passage.

A certain four-wheeled vehicle has the minimum turning radius of 4.1 m at a moving speed of 1 m/sec under the operative condition that the body of the vehicle does not slide in the lateral direction. The larger the moving speed of the vehicle becomes, the larger the minimum radius of turning movement becomes.

When the optimum distance between the adjacent ground points is determined, it is generally determined in the range of 1/50 to 4 times of the minimum turning radius by using the latter as a reference. Determination of the range in that way is made in view of the fact that when the aforesaid distance is determined longer than 16 m that is 4 times of the minimum turning radius, unpractical delay of steering occurs during turning movement at a corner and in contrast with the foregoing case when it is determined shorter than 8 mm that is 1/50 times of the radius, too long time is required for calculating the existent position of the vehicle and thereby undesirable delay of steering occurs.

Thus, it is preferable that a radius of curvature of a circle which is defined by the adjacent three ground points among a series of ground points is determined larger than the aforesaid minimum turning radius, wherein the distance between the adjacent two points is determined in the above-described manner.

Since the minimum turning radius with which the vehicle can turn without any occurrence of lateral slippage is increased in proportion to increase in speed of movement of the vehicle, the distance between the adjacent ground points during movement at a high speed is required to be widened in comparison with movement at a low speed. Similarly, the radius of curvature of a circle at a low speed. Similarly, the radius of curvature of a circle defined by the adjacent three ground points during movement at a high speed is required to be enlarged in comparison with movement at a low speed.

Once the moving passage of the vehicle is taught in the form of a series of ground points of which distance between the adjacent ones is determined in consideration of the above-mentioned facts, the vehicle is steered under control in accordance with a steering angle command which is issued while the position of the series of ground points is utilized as target ground point.

Figure 33:
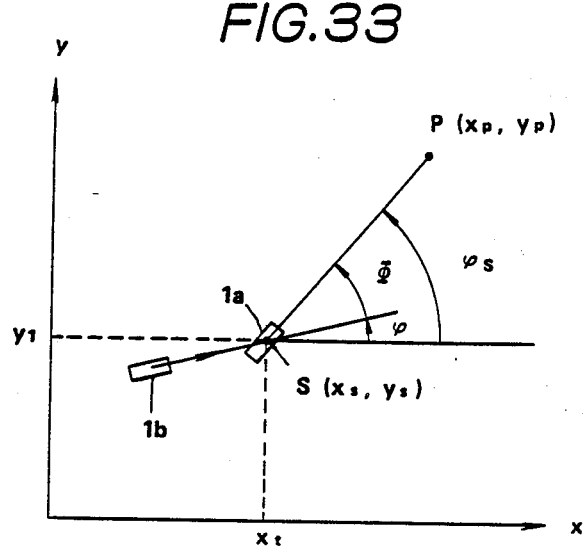
FIG. 33 is a schematic view illustrating a principle for obtaining a steering angle.

Here, the aforesaid steering angle command will be described by employing a widely used expression system as shown in FIG. 33 in which four-wheeled vehicle is represented by equi-two-wheeled vehicle. In the drawing reference numeral 1a designates a steering wheel of the vehicle and reference numeral 1b does a non-steering wheel of the same.

When it is assumed that coordinates of the steering wheel 1a are represented by $S(x_s, y_s)$ and coordinates of the target ground point (one ground point among a series of ground points) are represented by $P(x_p, y_p)$, an angle of $\phi_s$ formed between the x-coordinate and the line segment $\overline{PS}$ is represented in accordance with the following formula (18).

$$\phi_s = \tan^{-1}\left(\frac{y_p - y_s}{x_p - x_s}\right) \quad (18)$$

Accordingly, when the direction of movement of the vehicle is identified by $\phi$, the steering angle command angle $\Phi$ is represented by the following formula.

$$\Phi = \phi_s - \phi \quad (19)$$
$$= \tan^{-1}\left(\frac{y_p - y_s}{x_p - x_s}\right) - \phi$$

Thus, the steering angle command $\Phi$ required for orienting toward the target ground point $P(x_p, y_p)$ can be obtained by observing the existent position $S(x_s, y_s)$ and the moving direction $\phi$ and using the formula (19).

In practice, a vehicle can fail to reach a target point or it can reach the target point with snake-motion due to steering characteristics, outside disturbs or the like. To obviate these problems the following two methods are employed.

Figure 34:
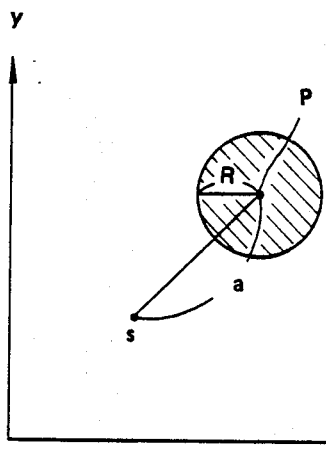
FIG. 34 is a schematic view illustrating a scope of a target ground point.

A first method is such that a predetermined range is provided for the target point, it is considered that the vehicle reaches the target point when it enters the aforesaid range and then the next point is taken as new target point. Concretely speaking, as shown in FIG. 34, an area within a circle having a radius R with the target point P located at the center thereof is defined as a range for the target point. A distance a between the target point P and the existent position $S(x_s,y_s)$ of the vehicle is calculated and when it is found that this distance a is smaller than the radius R, it is considered that the vehicle reaches the target point.

A second method is such that when the vehicle moves by the range which is considered as a fact that it reaches the target point, the next point is taken as new target point from the time when it moves by in that way. Thus, the time when the vehicle moves past the target point is determined in the following manner.

Figure 35:
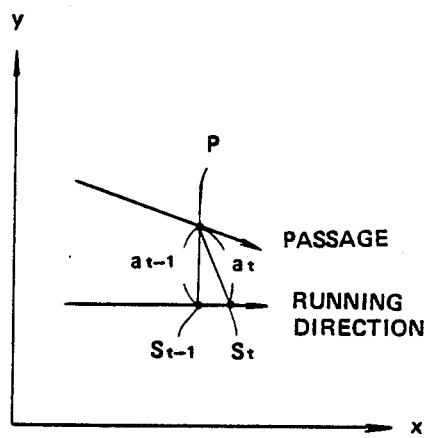
FIG. 35 is a schematic view illustrating a method of determining whether the vehicle moves past the target ground point or not.

As shown in FIG. 35, the current position of the vehicle is represented by $S_t$ and the position of the same located before a certain unit time is represented by $S_{t-1}$. Then, a distance $a_t$ between the position S and the target point P and a distance $a_{t-1}$ between the position $S_{t-1}$ and the target P are calculated, and decision is made such that the time when the following condition is established is considered as the time when the vehicle moves past the target point.

$$a_t > a_{t-1} \quad (20)$$

Thus, by determining new target ground point with the use of the first and second methods as mentioned above it is possible that the vehicle returns to the planned moving passage even after the handle is operated incorrectly due to irregularities on the ground or the vehicle moves round the planned moving passage due to the existence of an obstacle.

Figure 36:
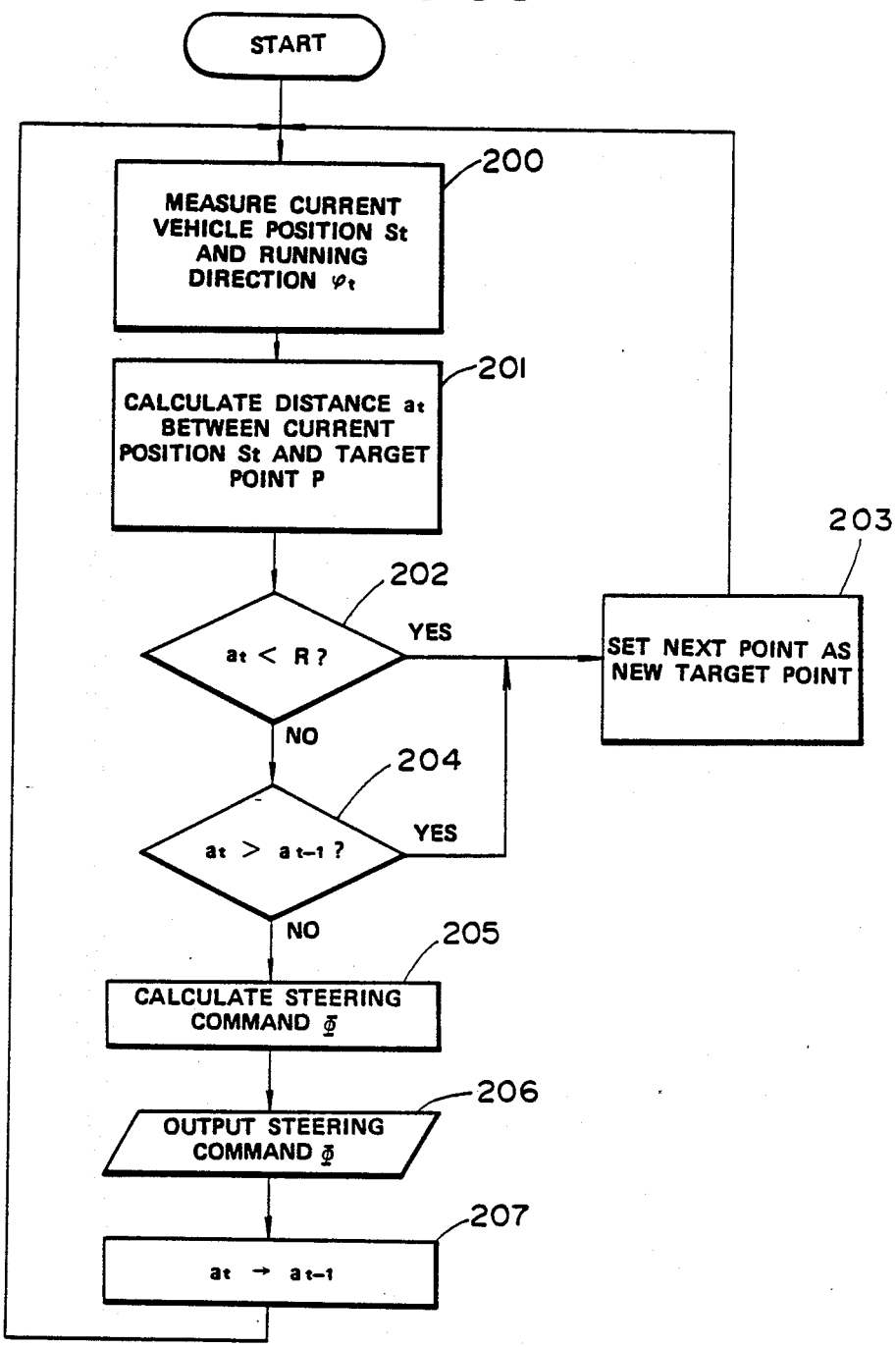
FIG. 36 is a flow chart illustrating steps for guiding movement of the vehicle.

Next, the above-mentioned methods will be explained in more detail by using a flow chart as shown in FIG. 36.

First, the current position $S_t$ and the direction $\phi_t$ of the vehicle are measured (Step 200). A distance $a_t$ between the current position $S_t$ and the target ground point P is calculated (Step 201).

Next, it is discriminated whether the calculated distance $a_t$ is smaller than a predetermined radius R or not (Step 202). When $a_t < R$ is discriminated, the program goes to Step 203 under the condition that it is considered that the vehicle reached the target ground point P. At Step 203 a ground point next in the series of ground points on the planned moving passage is taken as new target ground point and then the program returns to Step 200. When the result of decision at Step 202 is $a_t \geq R$, the program goes to Step 204 because the vehicle fails to reach the target ground point P.

At Step 204 it is discriminated whether the distance $a_t$ is larger than $a_{t-1}$ as measured before a certain unit time or not. When it is discriminated that $a_t > a_{t-1}$ is established, the vehicle moves away from the target point P. Thus, this time is taken as the time when the vehicle moves past the target point P and then the program goes to Step 203. When it is discriminated that $a_t \leq a_{t-1}$ is established, the vehicle moved closer to the target point P. Thus, the program goes to Step 205. Incidentally, since a distance $a_{t-1}$ before a certain unit time is not existent when a distance $a_t$ is first calculated after new target point is determined, the program jumps over Step 204.

At Step 205 a steering angle command $\Phi$ is calculated in accordance with the formula (19) and at Step 206 the steering angle command $\Phi$ is outputted.

Then, $a_t$ is rewritten to $a_{t-1}$ (Step 207) and after $\Delta t$ elapses, the program goes to Step 200 again.

Figure 37:
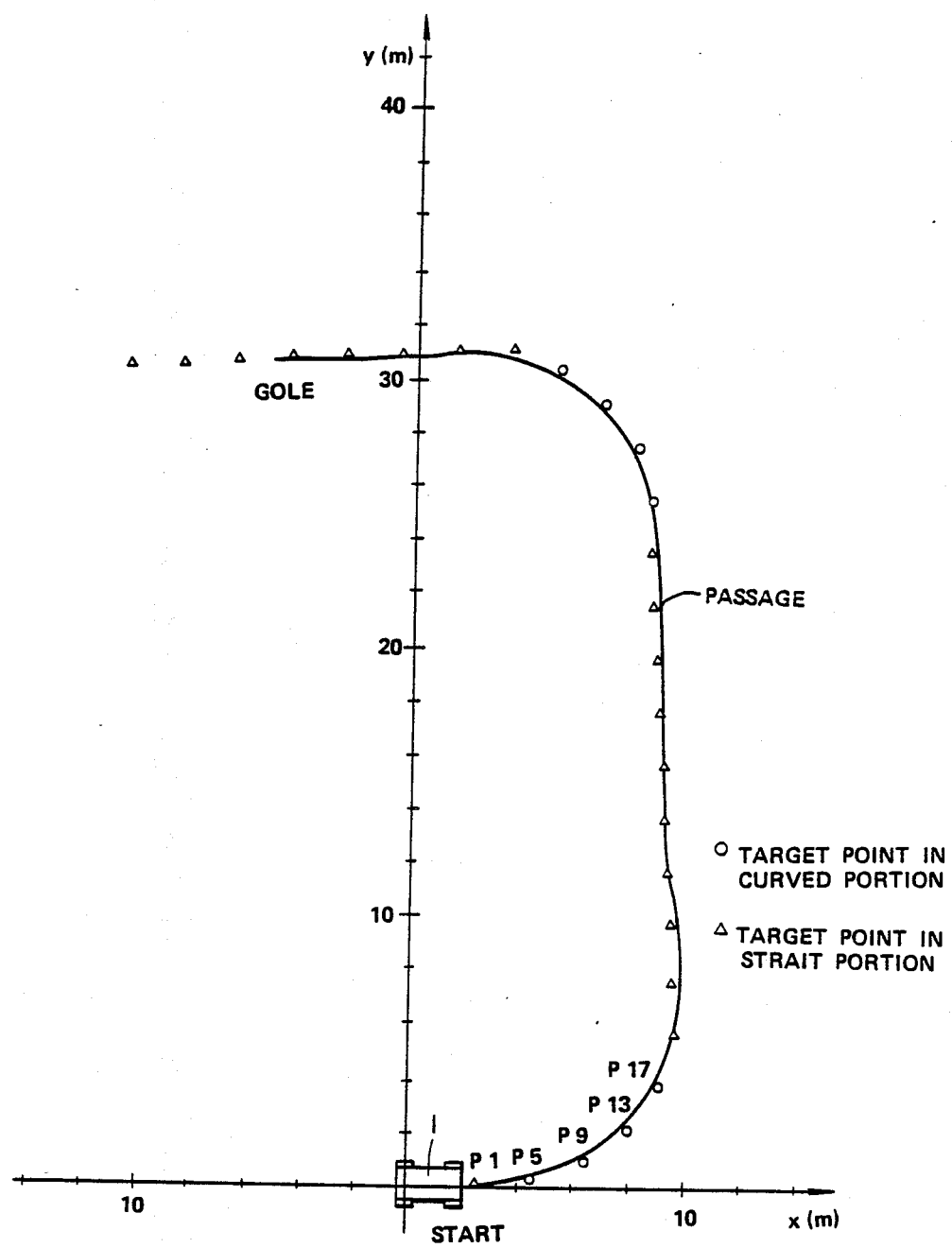
FIG. 37 is a graph illustrating the result of guiding of movement of the vehicle in the case where the steps as shown in FIG. 36 are practiced.

FIG. 37 is graph which illustrates the results of practical movement of a four-wheels vehicle 1 to which the above-mentioned controlling method is applied. The practical passage as identified by a real line in the drawing illustrates a locus of center point of the line segment which extends between both the left-handed and right-handed wheels of the vehicle. The passage is constituted by linear lines and arches having a radius of 6 m and a distance between target points is set to 50 cm. In the drawing, however, target points are plotted at every 2 meters for simplification.

The vehicle 1 is a four-wheeled electrically driven motorcar having fore steering wheels and rear driving wheels. Detection of the direction of movement of the vehicle is effected with the use of a gyrocompass and the-current position of the vehicle is obtained by a combination of moving distance as measured by a pulse encoder fitted to a wheel and the direction of movement of the vehicle. The maximum operating angle of a steering handle is set to 30°. Moving experiments were carried out on an asphalt paved ground and a speed of the vehicle was set to 4 km/h.

Sampling time was set to 130 m sec to meet response of the steering system. As will be apparent from the drawing, a sufficiently high accuracy in guiding of movement of the vehicle could be obtained. Processing time for executing the steps as shown in the flow chart amounts to about 10 m sec of assembler worlds. Accordingly, the residual sampling time of 120 m sec can be used for the purpose of controlling of an obstacle sensor, self-diagnosis, man-machine interface or the like.

It should be noted that the present invention should not be limited only to four-wheeled vehicle. Alternatively, it may be equally applied to three-wheeled vehicle, both wheel independently driven vehicle, crawler, all direction movable vehicle, six-wheeled vehicle, double feet walking machine, multi-feet walking machine or the like unattended vehicle.

Next, description will be made below as to controlling of a vehicle of which rear wheel serves as steering wheel.

Figure 38:
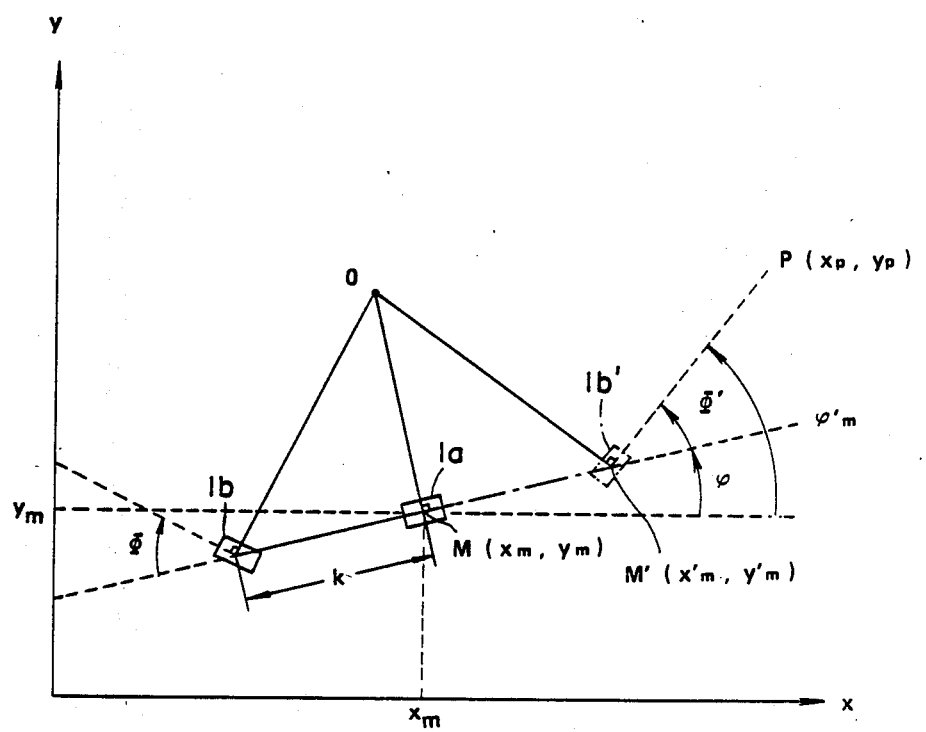
FIG. 38 is a schematic view illustrating how to obtain a steering angle relative to a rear wheel driving vehicle.

In FIG. 38 a four-wheeled vehicle is illustrated as an equi-two-wheeled vehicle in the same manner as in FIG. 33 When it is supposed that an imaginary wheel $1b'$ is located at the position forwardly of a fore wheel $1a$ that is a non-steering wheel by a distance equal to the length of a wheel base of the vehicle, coordinates M' $(x'_m, y'_m)$ of the steering wheel $1b'$ are represented in accordance with the following formulas on the assumption that coordinates of the fore wheel $1a$ are identified by $M(x_m, y_m)$, the length of the wheel base is identified by K and the direction of movement of the vehicle is identified by $\phi$.

$$x'_m = x_m + K\cos\phi \\ y'_m = y_m + K\sin\phi \quad (21)$$

On the other hand, a steering angle $\Phi'$ for orienting the imaginary steering wheel $1b'$ toward a target point P through which the vehicle is to move is obtainable in the following manner.

When coordinates of the target point are identified by $P(x_p, y_p)$, an angle $\phi'_m$ formed between the x-coordinate and a line segment $\overline{PM'}$ is represented by the following formula.

$$\phi'_m = \tan^{-1}\left(\frac{y_p - y'_m}{x_p - x'_m}\right) \quad (22)$$

Accordingly, the steering angle $\phi'$ of the imaginary steering wheel $1b'$ is represented in the following.

$$\phi' = \phi'_m - \phi \quad (23)$$

A steering angle $\Phi$ of the actual steering wheel $1b$ is an angle which has its mark reversed to that of the steering angle $\phi'$ and therefore it is represented by the following formula.

$$\Phi = -\Phi' \quad (24)$$

Accordingly, the steering angle $\Phi$ can be finally represented by using the formula (24) as well as the formulas (21) to (23) in the following.

$$\Phi = -\tan^{-1}\left(\frac{y_p - y_m - K\sin\phi}{x_p - x_m - K\cos\phi}\right) + \phi \quad (25)$$

Thus, a steering angle $\Phi$ required for orienting toward the target point P $(x_p, y_p)$ can be obtained by measuring the current position M $(x_m, y_m)$ of the vehicle and the orientation angle $\phi$ of the same and then putting the results of measurement into the formula (25).

As will be apparent from FIG. 38, a rear wheel steering vehicle of which rear wheel $1b$ is controlled to assume the steering $\Phi$ and a fore wheel steering vehicle of which imaginary steering wheel $1b'$ is controlled to assume the steering angle $\Phi'$ have the same center O of turning movement and the same radius of turning movement and moreover they have an approximate transitional response characteristic relative to a predetermined value.

An orientation angle $\phi$ of a vehicle can be measured, for instance, by means of a gyrocompass, as mentioned above. Further, the current position $M(x_m, y_m)$ of the vehicle can be obtained from the formula (17).

Figure 39:
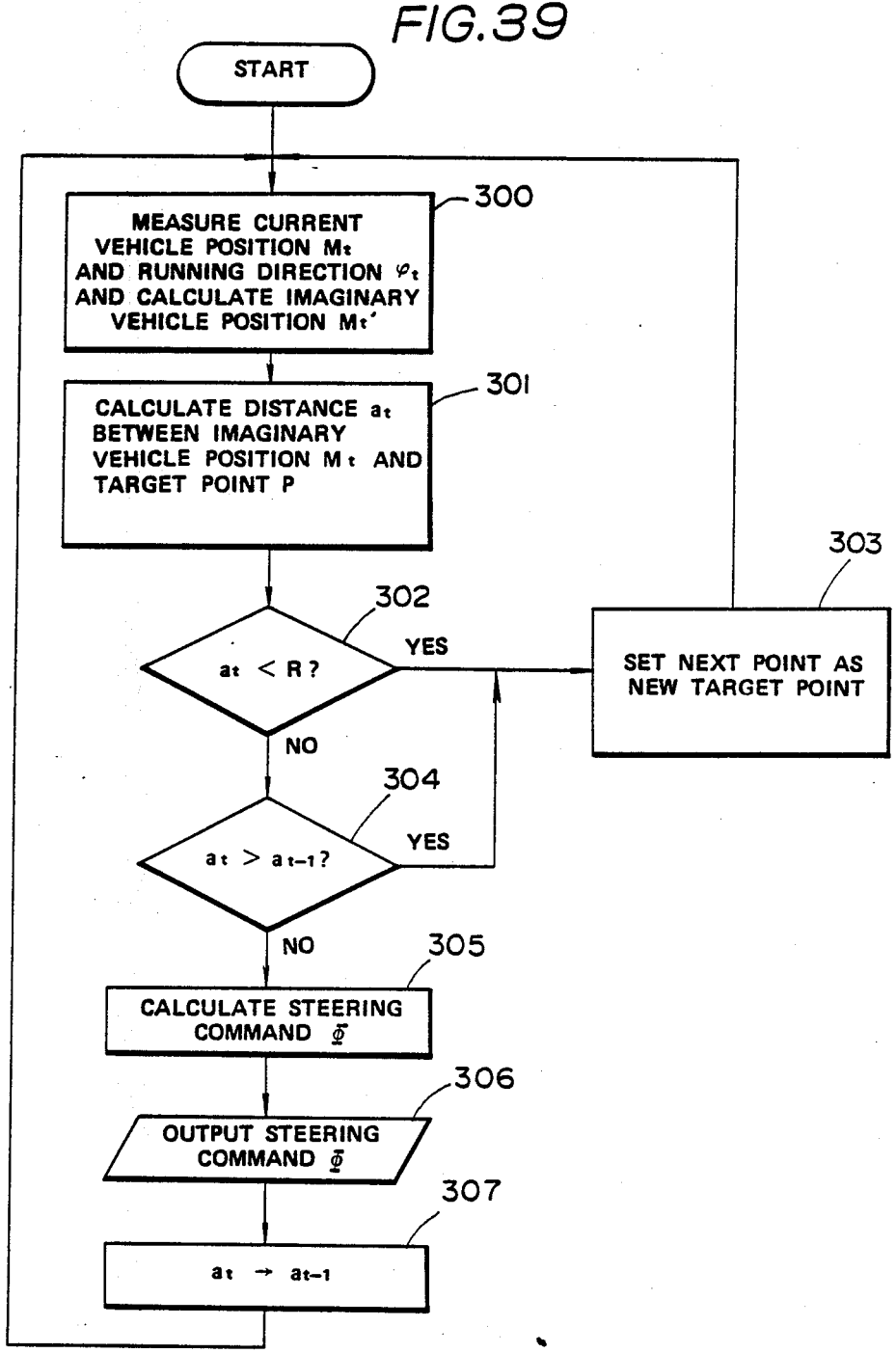
FIG. 39 is a flow chart illustrating steps in the case where movement of the rear wheel driving vehicle is guided.

FIG. 39 illustrates steps of guiding of a vehicle wheel steering vehicle along a passage which is previously taught in the form of a series of ground points, by using the steering angle $\Phi$ which has been obtained in the above-described manner.

The steps in FIG. 39 are executed by using position M' in place of position S in FIG. 34 and moreover using positions $M_{t-1}$ and $M_t$ in place of positions $S_{t-1}$ and $S_t$ in FIG. 35.

First, at Step 300 the current position $M_t'$ of the vehicle and the direction of movement of the same (orientation angle) $\phi_t$ are measured, and the imaginary current position $M_t'$ of the vehicle is calculated in accordance with the formula (21). Then, a distance $a_t$ between the thus obtained imaginary current position $M_t'$ and the target point P is calculated (Step 301)

Thereafter, at Steps 302 to 307 processing similar to the content at Steps 202 to 207 in FIG. 36 is executed but at Step 305 the steering angle command $\Phi$ is processed with reference to the formula (25).

Thus, by setting the imaginary steering wheel $1b'$ and then carrying out steering control, a vehicle can be oriented toward a target point smoothly and with high response in the same manner as in the case the fore wheels are steered.

While the present invention has been described above with respect to several preferred embodiments thereof, it should be noted that it should not be limited only to them but various changes or modifications may be made in any acceptable manner without departure from the spirit and scope of the invention as defined by the appended claims.

What is claimed is:

1. A method of guiding an unmanned vehicle comprising the steps of;
    placing a ground mark comprising first, second and third line segments in such a manner that they extend in the transverse direction relative to a passage of said unmanned vehicle, said first and second line segments being in parallel with one another and said third line segment being located between the first and second line segments and extending in the non-parallel relation relative to them,
    mounting line segment detecting means on the unmanned vehicle,
    measuring the amount of movement of the vehicle from the time when the first line segment is detected by said line segment detecting means to the time when the third line segment is detected as well as the amount of movement of the vehicle from the time when the third line segment is detected to the time when the second line segment is detected,
    obtaining a relative positional relation between the ground mark and the vehicle with reference to each of said measured distances, and
    carrying out guiding of the vehicle in accordance with said relative positional relation.

2. A method of guiding an unmanned vehicle as claimed in claim 1, wherein each of the amounts of movement is measured with reference to time required for movement of the vehicle by each of the distances in the case where a moving speed of the vehicle is kept constant.

3. A method of guiding an unmanned vehicle as claimed in claim 1, wherein said line segment detecting means is accommodated within the hollow space in one of the wheels for the vehicle.

4. A method of guiding an unmanned vehicle comprising the steps of;
placing at least a ground mark comprising first, second, third and fourth line segments in such a manner they extent in the transverse direction relative to a moving passage of said unmanned vehicle, said first and second line segments being in parallel with one another and at least one of said third and fourth line segments being located between the first and second line segments and extending in the non-parallel relation relative to them,
mounting a single line segment detecting means on the unmanned vehicle,
measuring each amount of movement of the vehicle between successive time points at which said line segment detecting means successively detects each of the line segments,
obtaining a relative positional relation between the ground mark and the vehicle with reference to each of thus measured amount, and
carrying out guiding of the vehicle in accordance with said relative positional relation.

5. A method of guiding an unmanned vehicle as claimed in claim 4, wherein said line segment detecting means is accommodated within the hollow space in one of the wheels for the vehicle.

6. A method of guiding an unmanned vehicle provided with a means for measuring a current position of the vehicle, comprising the steps of:
preparing a plurality of ground marks having a shape for enabling the vehicle to detect relative positions of the vehicle with respect to the ground marks;
disposing the ground marks at a plurality of predetermined locations within a vehicle moving area;
storing positions of the ground marks in the form of coordinates of a coordinate system into a memory;
selecting some of the ground marks and assigning orders to the selected ground marks one after another so as to designate a passage for the vehicle;
obtaining a plurality of ground points between each of adjacent two of the selected ground marks by interpolation, and storing coordinates of the ground points in the coordinate system into the memory;
teaching the passage to the vehicle by using the ground points;
guiding the vehicle along the passage with reference to the current position of the vehicle measured by the vehicle and target points comprising the ground marks and ground points;
detecting the relative position of the vehicle with respect to the ground marks by the vehicle each time the vehicle passes the ground marks; and
correcting the current position of the vehicle measured by the vehicle on the relative position.

7. A method of guiding an unmanned vehicle as claimed in claim 6, wherein the marks have certain directionality.

8. A method of guiding an unmanned vehicle as claimed in claim 7, wherein said interpolation is selectively effected in the form of linear interpolation or arch interpolation and in the case where among the selected ground marks the adjacent two ground marks have the same directionality, linear interpolation is effected therebetween, while in the case where the adjacent two ground marks have different directionality, arch interpolation is effected therebetween.

9. A method of guiding an unmanned vehicle as claimed in claim 8, wherein the position of the ground marks estimated on the vehicle side is obtained with reference to the direction and amount of movement of the vehicle.

10. A method of guiding an unmanned vehicle as claimed in claim 6, wherein the position of the vehicle is measured by the vehicle with reference to the direction and amount of movement of the vehicle.

11. A method of guiding an unmanned vehicle wherein a plurality of ground marks having plural linear line segments arranged in a predetermined geometrical relation are placed on a passage of said vehicle, each of successive time points at which the vehicle moves across each of said line segments is detected in response to the output from a line segment detecting means mounted on the vehicle, a relative positional relation between the ground marks and the vehicle is obtained from the amount of movement of the vehicle at the successive time points at which the vehicle moves across the ground marks, and guiding of the vehicle is effected in accordance with the aforesaid positional relation, comprising the steps of;
measuring amount of movement of the vehicle at each of the successive time points at which said line segment detecting means moves toward and away from the line segments by making a comparison between detection output from the line segment detecting means and a predetermined threshold, and
obtaining amount of movement of the vehicle at each of the successive time points at which the line segment detecting means moves past the center position of the line segments by obtaining an average value among amount of movement of the vehicle.

12. A method of guiding an unmanned vehicle provided with a means for measuring a current position of the vehicle wherein a passage of the vehicle is taught to the vehicle in the form of a series of target points on the passage and the vehicle is guided along the passage with reference to a current target point among the target points and a current position of the vehicle is measured by the vehicle, said method comprising the steps of:
obtaining a distance between the position of the current target point and the current vehicle position measured by the measuring means provided on the vehicle; and
setting another target point located next to the current target point as a new target point when said distance becomes shorter than a predetermined distance or increases as the vehicle moves on.

13. A method of guiding an unmanned vehicle as claimed in claim 12, wherein a distance between the adjacent ground points is determined in the range of 1/50 to 4 times of the minimum turning radius with which the vehicle does not slide in the lateral direction.

14. A method of guiding an unmanned vehicle as claimed in claim 12, wherein teaching is effected with respect to said series of ground points in such a manner that a radius of a circle as defined by the adjacent three ground points is determined larger than the minimum turning radius.

15. A method of guiding movement of an unmanned vehicle as claimed in claim 12, wherein said predetermined distance is a distance which is considered as a fact that the vehicle has reached the current target point.

16. A method of guiding an unmanned vehicle comprising the steps of;

placing at least a ground mark comprising first and second line segments in such a manner that they extend in the transverse direction relative to a moving passage of said unmanned vehicle, said first and second line segments extending in the non-parallel relation, mounting two line segment detecting means on the vehicle with a predetermined distance kept between the adjacent ones in the direction of width of the vehicle, measuring as first distance a distance of movement of the vehicle from the time when either of said two line segment detecting means detects either of the line segments to the time when the other line segment detecting means detects the same line segment, measuring as second distance a distance of movement of the vehicle from the time when either one of said two line segment detecting means detects the first line segment to the time when it detects the second line segment, obtaining a relative positional relation between the ground mark and the vehicle with reference to said first and second distances, and carrying out guiding of movement of the vehicle in accordance with said relative positional relation.

17. A method of guiding an unmanned vehicle as claimed in claim 16, wherein said line segment detecting means is accommodated within the hollow space in one of the wheels for the vehicle.

18. A method of guiding an unmanned vehicle provided with a means for measuring a current position of the vehicle, comprising the steps of:

preparing a plurality of ground marks having a shape for enabling the vehicle to detect relative positions of the vehicle with respect to the ground marks;

disposing the ground marks at a plurality of predetermined locations within a vehicle moving area;

determining a passage for the vehicle by manually running the vehicle such that the vehicle selectively passes some of the ground marks;

measuring by the vehicle the positions of the vehicle at a plurality of locations between each of the two adjacent ground marks while the vehicle runs along the passage thus determined, and storing the vehicle positions thus measured into a memory as the positions of the ground points;

teaching the passage to the vehicle by using the ground points;

guiding the vehicle along the passage by using the current position of the vehicle measured by the vehicle and target points comprising the ground marks and ground points;

detecting the relative position of the vehicle with respect to the ground marks by the vehicle each time the vehicle passes the ground marks; and correcting the current position of the vehicle measured by the vehicle based on the relative position.

19. In a method of guiding an unmanned vehicle provided with a means for measuring a current position of the vehicle and having a steering wheel and a non-steering wheel wherein a passage of the vehicle is taught to the vehicle in the form of a series of target points on the passage and the vehicle is guided along the passage with reference to a current target point among the target points and a current position of the vehicle is measured by the vehicle, where the steering wheel is positioned at rear side of the vehicle as seen in the direction of the movement of the vehicle, said method comprising the steps of:

providing an imaginary steering wheel which is located forward of the non-steering wheel by a length of a wheel base between the steering and non-steering wheels;

obtaining a steering angle and a steering direction when the imaginary steering wheel is oriented toward the current target point; and operating the steering wheel by said steering angle in the direction opposite to the steering direction.

* * * * *